United States Patent
Chachra et al.

(10) Patent No.: US 12,094,024 B1
(45) Date of Patent: *Sep. 17, 2024

(54) DYNAMICALLY GENERATING AND UPDATING MULTIPLIERS FOR A TRANSPORTATION MATCHING SYSTEM USING MACHINE LEARNING

(71) Applicant: Lyft, Inc., San Francisco, CA (US)

(72) Inventors: Ricky Chachra, San Francisco, CA (US); Tzu-Hsin Chiao, Seattle, WA (US); Ashivni Shekhawat, Emeryville, CA (US); Christopher Sholley, San Francisco, CA (US); Jerome Hong-Phat Thai, Berkeley, CA (US); Adriel Frederick, Berkeley, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,127

(22) Filed: Sep. 18, 2023

Related U.S. Application Data

(63) Continuation of application No. 18/059,071, filed on Nov. 28, 2022, now Pat. No. 11,763,411, which is a
(Continued)

(51) Int. Cl.
*G06F 7/70* (2006.01)
*G06Q 50/40* (2024.01)
(Continued)

(52) U.S. Cl.
CPC ............ *G06Q 50/40* (2024.01); *H04W 4/021* (2013.01); *H04W 4/40* (2018.02); *G06N 20/00* (2019.01)

(58) Field of Classification Search
CPC ........ G06Q 50/30; H04W 4/021; H04W 4/40; G06N 20/00; G06F 7/70
(Continued)

(56) References Cited

U.S. PATENT DOCUMENTS

| 7,663,528 B1 | 2/2010 | Malakian et al. |
| 9,358,986 B2 | 6/2016 | Hunt |

(Continued)

FOREIGN PATENT DOCUMENTS

WO    2020/159431 A1    8/2020

OTHER PUBLICATIONS

Alexander et al., Origin-destination trips by purpose and time of day inferred from mobile phone data, 2015, Elsevier, Transportation Research Part C 58, pp. 240-250 (Year: 2015).
(Continued)

*Primary Examiner* — Shardul D Patel
(74) *Attorney, Agent, or Firm* — Keller Preece PLLC

(57) ABSTRACT

This disclosure covers machine-learning methods, non-transitory computer readable media, and systems that generate a multiplier that efficiently and effectively provides on-demand transportation services for a geographic area. The methods, non-transitory computer readable media, and systems dynamically adjust the multiplier with machine learners to maintain a target estimated time of arrival for a provider device to fulfill a request received from a requestor device. In some embodiments, the methods, non-transitory computer readable media, and systems generate a multiplier report comprising a representation of a geographic area and an indication of the multiplier to facilitate inflow and outflow of provider devices within and without the geographic area.

20 Claims, 9 Drawing Sheets

Related U.S. Application Data continuation of application No. 16/921,698, filed on Jul. 6, 2020, now Pat. No. 11,514,546, which is a continuation of application No. 15/810,028, filed on Nov. 11, 2017, now Pat. No. 10,706,487.

(51) Int. Cl.
*H04W 4/021* (2018.01)
*H04W 4/40* (2018.01)
*G06N 20/00* (2019.01)

(58) Field of Classification Search
USPC .......................................................... 701/117
See application file for complete search history.

(56) References Cited

U.S. PATENT DOCUMENTS

| | | |
|---|---|---|
| 9,864,778 B1 | 1/2018 | Strand et al. |
| 10,032,181 B1 | 7/2018 | Madhow et al. |
| 10,157,436 B2 | 12/2018 | Samocha et al. |
| 10,552,773 B1 | 2/2020 | Shah et al. |
| 10,706,487 B1 * | 7/2020 | Chachra .................. G06N 7/01 |
| 10,794,713 B2 | 10/2020 | Magazinik et al. |
| 11,035,683 B2 | 6/2021 | Marco |
| 11,514,546 B2 * | 11/2022 | Chachra .................. H04W 4/40 |
| 11,763,411 B1 * | 9/2023 | Chachra ................ H04W 4/021 701/117 |
| 2005/0015316 A1 | 1/2005 | Salluzzo |
| 2005/0021225 A1 | 1/2005 | Kantarjiev et al. |
| 2006/0069601 A1 | 3/2006 | Simon et al. |
| 2008/0195428 A1 | 8/2008 | O'Sullivan |
| 2009/0119006 A1 | 5/2009 | Silver et al. |
| 2009/0210262 A1 | 8/2009 | Clark et al. |
| 2009/0325556 A1 | 12/2009 | Lee et al. |
| 2010/0268450 A1 | 10/2010 | Stephen |
| 2011/0161116 A1 | 6/2011 | Peak et al. |
| 2011/0184640 A1 | 7/2011 | Coleman et al. |
| 2011/0246404 A1 | 10/2011 | Lehmann et al. |
| 2012/0246039 A1 | 9/2012 | Fain et al. |
| 2012/0316763 A1 | 12/2012 | Haynes, III et al. |
| 2013/0041708 A1 | 2/2013 | Jackson, Jr. et al. |
| 2013/0132140 A1 | 5/2013 | Amin et al. |
| 2013/0246207 A1 | 9/2013 | Novak et al. |
| 2013/0253969 A1 | 9/2013 | Das et al. |
| 2014/0129951 A1 | 5/2014 | Amin et al. |
| 2014/0156410 A1 | 6/2014 | Wuersch et al. |
| 2014/0172439 A1 | 6/2014 | Conway et al. |
| 2014/0207375 A1 | 7/2014 | Lerenc |
| 2014/0279654 A1 | 9/2014 | Lievens et al. |
| 2014/0337123 A1 | 11/2014 | Nuernberg et al. |
| 2014/0358435 A1 | 12/2014 | Bell et al. |
| 2015/0039214 A1 | 2/2015 | McClellan et al. |
| 2015/0046080 A1 | 2/2015 | Wesselius et al. |
| 2015/0081399 A1 | 3/2015 | Mitchell et al. |
| 2015/0154810 A1 | 6/2015 | Tew et al. |
| 2015/0161554 A1 | 6/2015 | Sweeney et al. |
| 2015/0161564 A1 | 6/2015 | Sweeney et al. |
| 2015/0206267 A1 | 7/2015 | Khanna et al. |
| 2015/0242772 A1 | 8/2015 | Backof, II et al. |
| 2015/0262430 A1 | 9/2015 | Farrelly et al. |
| 2015/0339928 A1 | 11/2015 | Ramanujam |
| 2015/0379437 A1 | 12/2015 | Reich |
| 2016/0026936 A1 | 1/2016 | Richardson et al. |
| 2016/0027307 A1 | 1/2016 | Abhyanker et al. |
| 2016/0034845 A1 | 2/2016 | Hiyama et al. |
| 2016/0098649 A1 | 4/2016 | Ifrach et al. |
| 2016/0117610 A1 | 4/2016 | Ikeda et al. |
| 2016/0148164 A1 | 5/2016 | Luk et al. |
| 2016/0171574 A1 | 6/2016 | Paulucci et al. |
| 2016/0171882 A1 | 6/2016 | Handley |
| 2016/0209220 A1 | 7/2016 | Laetz |
| 2016/0320198 A1 | 11/2016 | Liu et al. |
| 2016/0321566 A1 | 11/2016 | Liu et al. |
| 2017/0034110 A1 | 2/2017 | Bijor et al. |
| 2017/0102243 A1 | 4/2017 | Samocha et al. |
| 2017/0124506 A1 | 5/2017 | Khan |
| 2017/0154348 A1 * | 6/2017 | Biswas .............. G06Q 30/0222 |
| 2017/0169377 A1 | 6/2017 | Liu et al. |
| 2017/0169535 A1 * | 6/2017 | Tolkin ................ G01C 21/3438 |
| 2017/0191842 A1 | 7/2017 | Igor et al. |
| 2017/0227370 A1 | 8/2017 | O'Mahony et al. |
| 2017/0262790 A1 | 9/2017 | Khasis |
| 2017/0353536 A1 | 12/2017 | Shraer et al. |
| 2017/0372235 A1 * | 12/2017 | Dayama .................. G06Q 10/06 |
| 2018/0025407 A1 | 1/2018 | Zhang et al. |
| 2018/0032928 A1 | 2/2018 | Li et al. |
| 2018/0075380 A1 * | 3/2018 | Perl ........................ G06Q 50/40 |
| 2018/0101878 A1 | 4/2018 | Marueli et al. |
| 2018/0121847 A1 | 5/2018 | Zhao et al. |
| 2018/0121958 A1 | 5/2018 | Aist et al. |
| 2018/0158322 A1 | 6/2018 | McDonnell et al. |
| 2018/0174446 A1 | 6/2018 | Wang |
| 2018/0190040 A1 | 7/2018 | Batten et al. |
| 2018/0211541 A1 * | 7/2018 | Rakah .................... G06Q 50/40 |
| 2018/0225796 A1 | 8/2018 | Liu |
| 2018/0232840 A1 | 8/2018 | Liu |
| 2019/0066251 A1 | 2/2019 | Samocha et al. |
| 2019/0340928 A1 | 11/2019 | Goldman et al. |
| 2020/0082313 A1 | 3/2020 | Crapis et al. |
| 2020/0082315 A1 | 3/2020 | Crapis et al. |
| 2020/0250600 A1 | 8/2020 | Gupta et al. |
| 2021/0072035 A1 | 3/2021 | Magazinik et al. |
| 2021/0192292 A1 | 6/2021 | Zhai |
| 2021/0192555 A1 | 6/2021 | Tang |

OTHER PUBLICATIONS

Chowdhry, Amit, Uber: Users are more likely to pay surge pricing if their phone battery is low, May 25, 2016. Forbes.com https://www.forbes.conn/sites/annitchowdhry/2016/05/25/uber-low-battery/#732fbb8074b3 (Year: 2016).

European Search Report for European Patent Application No. EP 17195935.6, mailed Dec. 11, 2017, 9 pages.

Lyft Help; "Personal Power Zones"; Date downloaded Jan. 12, 2022; https://help.lyft.com/hc/e/articles/115012926807-Personal-Power-Zones.

Ma, et al. "Spatio-temporal pricing for ridesharing platforms." Operations Research 70.2 (2022): 1025-1041. [online], [retrieved on Dec. 17, 2022]. Retrieved from the Internet <https://arxiv.orgiabs/1801.04015> (Year: 2018).

Office Action as received in European Application 17195935.6 dated Oct. 18, 2019.

Office Action as received in Israeli Application 254949 dated Jul. 26, 2020.

Office Action as received in Israeli Application 254949 dated Sep. 24, 2019.

Summons to attend oral proceedings as received in European Application 17195935.6 dated Jun. 16, 2020.

U.S. Appl. No. 16/125,563, filed Nov. 30, 2018, Office Action.
U.S. Appl. No. 16/125,563, filed May 1, 2019, Office Action.
U.S. Appl. No. 16/125,563, filed Oct. 8, 2019, Notice of Allowance.
U.S. Appl. No. 16/125,551, filed Aug. 14, 2020, Office Action.
U.S. Appl. No. 16/125,527, filed Aug. 18, 2020, Office Action.
U.S. Appl. No. 16/125,540, filed Aug. 19, 2020, Office Action.
U.S. Appl. No. 15/810,028, filed Dec. 2, 2019, Office Action.
U.S. Appl. No. 15/810,028, filed Apr. 30, 2019, Notice of Allowance.
U.S. Appl. No. 16/539,965, filed Jun. 8, 2021, Office Action.
U.S. Appl. No. 16/539,965, filed Sep. 26, 2022, Office Action.
U.S. Appl. No. 16/539,965, filed Apr. 21, 2023, Office Action.
U.S. Appl. No. 16/539,965, filed Oct. 26, 2023, Office Action.
U.S. Appl. No. 14/985,565, filed Aug. 29, 2017, Office Action.
U.S. Appl. No. 14/985,565, filed Feb. 21, 2018, Office Action.
U.S. Appl. No. 14/985,565, filed May 29, 2018, Office Action.
U.S. Appl. No. 14/985,565, filed Dec. 17, 2018, Office Action.
U.S. Appl. No. 14/985,565, filed Apr. 4, 2019, Office Action.
U.S. Appl. No. 14/985,565, filed Sep. 16, 2019, Office Action.
U.S. Appl. No. 14/985,565, filed Jun. 4, 2020, Notice of Allowance.
U.S. Appl. No. 15/290,366, filed Jun. 25, 2019, Office Action.

(56) References Cited

OTHER PUBLICATIONS

U.S. Appl. No. 15/290,366, filed Jan. 10, 2020, Office Action.
U.S. Appl. No. 15/290,366, filed May 13, 2020, Office Action.
U.S. Appl. No. 15/290,366, filed Oct. 27, 2020, Office Action.
U.S. Appl. No. 15/290,366, filed Mar. 22, 2021, Office Action.
U.S. Appl. No. 15/290,366, filed Jun. 29, 2021, Office Action.
U.S. Appl. No. 14/880,021, filed Jan. 13, 2017, Office Action.
U.S. Appl. No. 14/880,021, filed Jul. 11, 2017, Office Action.
U.S. Appl. No. 14/880,021, filed Dec. 5, 2017, Office Action.
U.S. Appl. No. 14/880,021, filed Apr. 17, 2018, Office Action.
U.S. Appl. No. 14/880,021, filed Aug. 23, 2018, Notice of Allowance.
U.S. Appl. No. 16/177,085, filed Nov. 5, 2020, Office Action.
U.S. Appl. No. 16/177,085, filed Mar. 25, 2021, Office Action.
U.S. Appl. No. 16/177,085, filed Feb. 18, 2022, Office Action.
U.S. Appl. No. 16/177,085, filed Jul. 18, 2022, Office Action.
U.S. Appl. No. 16/177,085, filed Oct. 27, 2022, Notice of Allowance.
U.S. Appl. No. 16/780,712, filed Mar. 25, 2022, Office Action.
U.S. Appl. No. 16/780,712, filed Jun. 24, 2022, Notice of Allowance.
U.S. Appl. No. 16/921,698, filed Mar. 31, 2022, Office Action.
U.S. Appl. No. 16/921,698, filed Jul. 26, 2022, Notice of Allowance.
U.S. Appl. No. 16/944,428, filed Dec. 27, 2022, Office Action.
U.S. Appl. No. 16/944,428, filed Jul. 21, 2023, Office Action.
U.S. Appl. No. 17/063,403, filed Dec. 28, 2022, Office Action.
U.S. Appl. No. 17/063,403, filed Mar. 22, 2023, Notice of Allowance.
U.S. Appl. No. 18/059,071, filed Mar. 30, 2023, Office Action.
U.S. Appl. No. 18/059,071, filed May 2, 2023, Notice of Allowance.
U.S. Appl. No. 16/944,428, filed Dec. 13, 2023, Office Action.

* cited by examiner

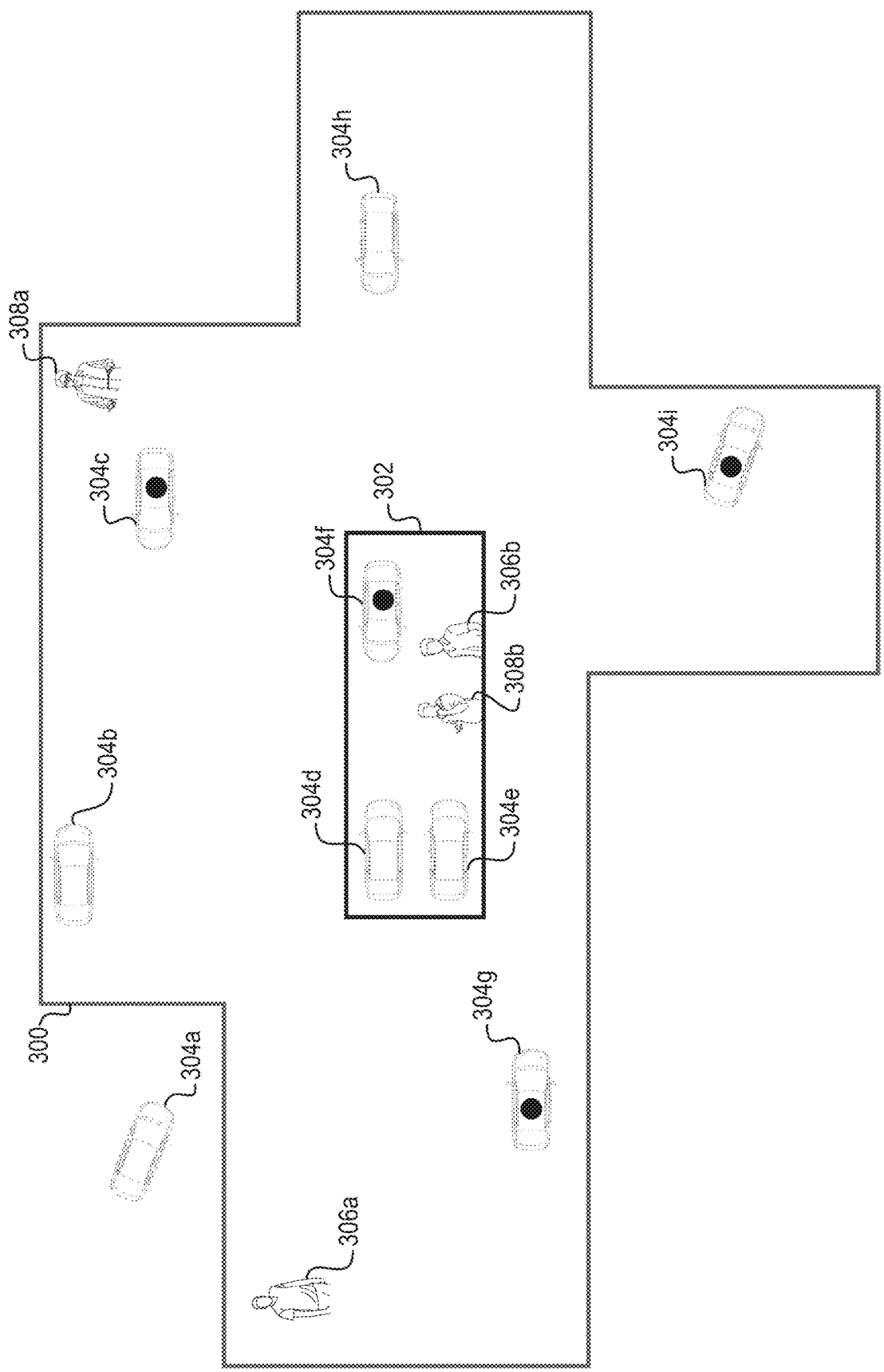

DYNAMICALLY GENERATING AND UPDATING MULTIPLIERS FOR A TRANSPORTATION MATCHING SYSTEM USING MACHINE LEARNING

CROSS-REFERENCE TO RELATED APPLICATIONS

The present application is a continuation of U.S. application Ser. No. 18/059,071, filed on Nov. 28, 2022, which is a continuation of U.S. application Ser. No. 16/921,698, filed on Jul. 6, 2020, now U.S. Pat. No. 11,514,546, granted Nov. 29, 2022, which is a continuation of U.S. application Ser. No. 15/810,028, filed on Nov. 11, 2017, now U.S. Pat. No. 10,706,487, granted Jul. 7, 2020. The aforementioned applications are hereby incorporated by reference in their entirety.

BACKGROUND

Service matching systems increasingly use web and mobile applications to manage on-demand requests for transportation. Some on-demand service matching systems, for example, receive requests from persons through a mobile application requesting transportation from one geographic area to another geographic area. To fulfill such requests, on-demand service matching systems traditionally use a computational model that matches nearby transportation vehicles with requests from persons seeking transportation. By efficiently matching nearby transportation vehicles with requests, on-demand service matching systems can use a computational model to reduce an estimated time of arrival of a transportation vehicle to a requestor's location.

Some conventional on-demand service matching systems use static computational models to match requests with nearby providers of transportation vehicles, such as drivers. Static computational models often cannot efficiently match requests with providers during volatile or high-volume time periods of requests. In other words, existing static computational models lack the ability to adjust the computational logic that matches transportation vehicles with requestors—while maintaining reasonable estimated times of arrival-when requests reach high volumes or rapidly vary in volume.

Accordingly, conventional on-demand service matching systems may create problems for both people requesting transportation vehicles and drivers providing transportation vehicles. For example, conventional on-demand service matching systems may rigidly and too quickly dispatch transportation vehicles to requestors based on a static computational model without adjusting for an increase in request volumes or decrease in available transportation vehicles. By employing static computational models, on-demand service matching systems often too quickly dispatch transportation vehicles and leave some requestors with either an excessive estimated time of arrival or no available transportation vehicle to satisfy the request.

SUMMARY

This disclosure describes one or more embodiments of methods, non-transitory computer readable media, and systems that solve the foregoing problems in addition to providing other benefits. While this summary refers to systems for simplicity, the summary also applies to certain disclosed methods and non-transitory computer readable media. To solve the foregoing and other problems, the disclosed machine-learning systems generate a multiplier that efficiently and effectively provides on-demand transportation services for a geographic area. The systems dynamically adjust the multiplier with machine learners to maintain a target estimated time of arrival for a provider device to fulfill a request received from a requestor device. In some embodiments, the disclosed systems generate a multiplier report comprising a representation of a geographic area and an indication of the multiplier to facilitate inflow and outflow of transportation vehicles within and without the geographic area.

In some embodiments, for instance, the systems use different machine learners to generate parameters that aid in determining a multiplier for a geographic area and a time period. A first machine learner generates parameters that define an arrival-time probability distribution of a number of reserve transportation vehicles required to maintain a target estimated time of arrival. A second machine learner generates parameters that define a number of transportation requests a dynamic transportation matching system can process while maintaining the number of reserve transportation vehicles. A third machine learner generates parameters that define a conversion probability distribution identifying multipliers that induce the number of transportation requests. Using each of the parameters, the systems determine a multiplier for the geographic area and the time period. The disclosed systems then optionally generate a multiplier report comprising a representation of the geographic area and an indication of the multiplier for the geographic area.

The disclosed systems avoid the limits and rigidity of conventional on-demand service matching systems. By generating a multiplier that facilitates allocation of transportation vehicles, the disclosed systems dynamically generate and adjust computational parameters to match transportation vehicles with transportation requests from requestor devices—while maintaining target estimated times of arrival-when transportation requests reach high volumes or rapidly vary. Unlike static computational models, the multiple machine learners enable the disclosed systems to adjust both computational parameters and transportation vehicles for increases in request volumes or decreases in available transportation requests.

BRIEF DESCRIPTION OF THE DRAWINGS

The detailed description refers to the drawings briefly described below.

FIGS. 3A-3B illustrate a geographic neighborhood that includes a geographic area in accordance with one or more embodiments.

DETAILED DESCRIPTION

Figure 1:
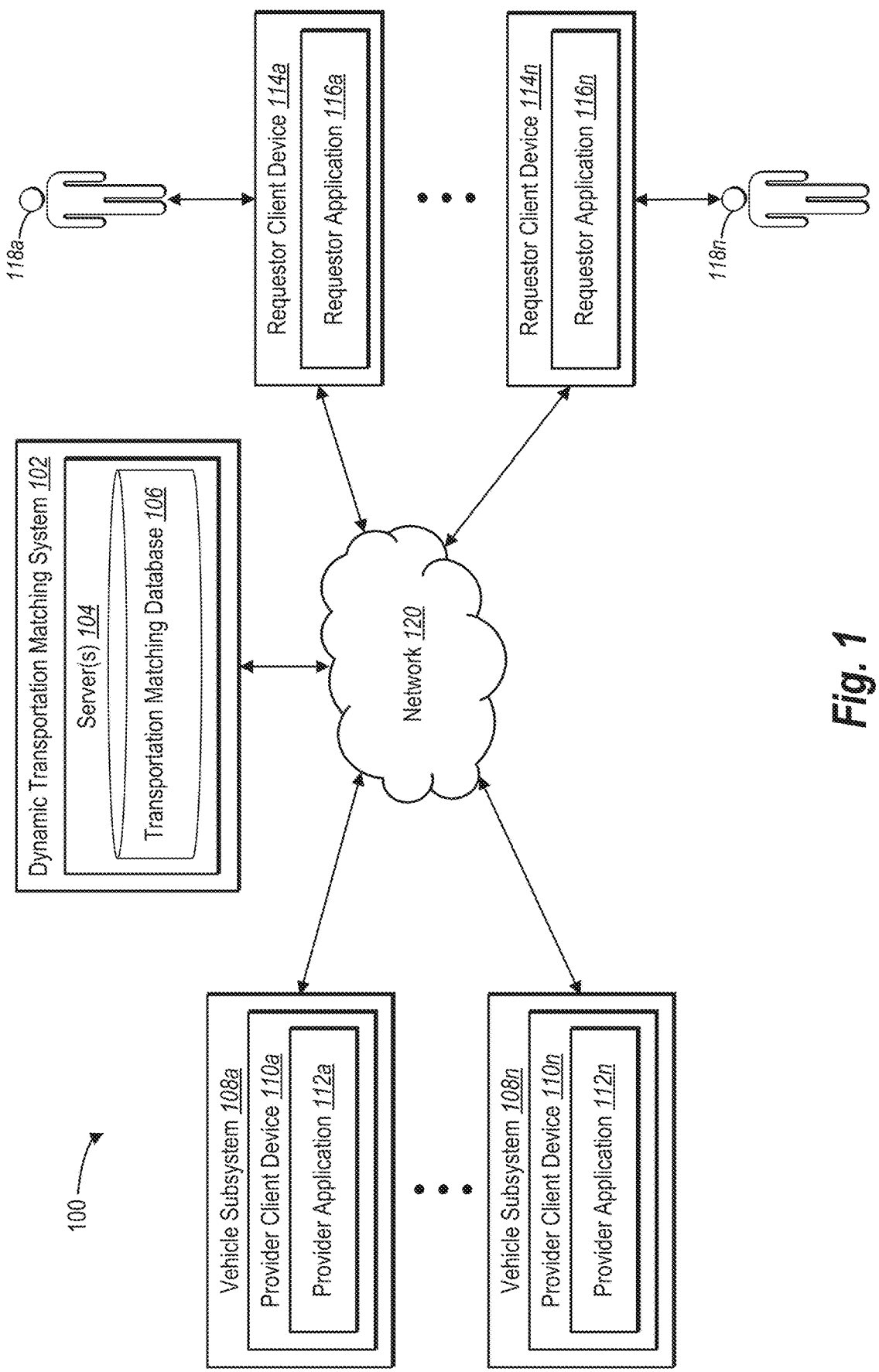
FIG. 1 illustrates a block diagram of an environment for implementing a dynamic transportation matching system in accordance with one or more embodiments.

This disclosure describes a dynamic transportation matching system that applies machine learning to generate a multiplier for facilitating movement of provider devices in and out of a geographic area during a time period. In particular, a dynamic transportation matching system dynamically adjusts a multiplier with machine learners to attract providers of transportation vehicles to a geographic area and maintain a target estimated time of arrival for pickup in response to requests received from requestor devices. In some embodiments, the system generates a multiplier report comprising a representation of the geographic area and an indication of the multiplier to facilitate inflow and outflow of transportation vehicles within and without the geographic area.

In some embodiments, for instance, the system uses machine learners to generate parameters that aid in determining a multiplier for a geographic area and a time period. A first machine learner generates efficiency parameters that define an arrival-time probability distribution of a number of reserve transportation vehicles required to maintain a target estimated time of arrival for the geographic area and the time period. A second machine learner generates supply parameters that define a number of transportation requests a dynamic transportation matching system can process while maintaining the number of reserve transportation vehicles. A third machine learner generates conversion parameters that define a conversion probability distribution identifying multipliers that induce the number of transportation requests. Based on each of the parameters, the dynamic transportation matching system determines a multiplier for the geographic area and the time period. In some embodiments, the dynamic transportation matching system generates a multiplier report comprising a representation of the geographic area and an indication of the multiplier for the geographic area.

To train the first machine learner to generate the efficiency parameters, the dynamic transportation matching system optionally inputs, for certain time periods of a specific geographic area, a number of available transportation vehicles and estimated times of arrival provided to potential requestors. The first machine learner then applies an algorithm to these inputs to generate efficiency parameters, such as by applying a stochastic gradient descent to the inputs. In some embodiments, the first machine learner generates an efficiency parameter representing a mean for the arrival-time probability distribution, an efficiency parameter representing a variance for the arrival-time probability distribution, and an efficiency parameter estimating a number of available transportation vehicles outside of an aggregation radius but inside a dispatch radius. In certain embodiments, the first machine learner uses online machine learning to update the efficiency parameters as it determines updated inputs for additional time periods.

By contrast, when training the second machine learner to generate the supply parameters, the dynamic transportation matching system optionally inputs, for certain time periods of a specific geographic neighborhood, a number of transportation requests and a number of available transportation vehicles. The second machine learner then applies an algorithm to these inputs to generate supply parameters, such as by applying a Kalman filter to the inputs. In some embodiments, the second machine learner generates a supply parameter representing an estimated net inflow of transportation vehicles and a supply parameter representing an estimated average number of transportation requests transportation vehicle can support for a geographic neighborhood during a time period. In certain embodiments, the second machine learner uses online machine learning to update the supply parameters as it determines updated inputs for additional time periods.

As for training the third machine learner to generate the conversion parameters, the dynamic transportation matching system optionally inputs, for certain time periods of a geographic neighborhood, numbers of potential requestors whose client device sent a price query for transportation, price estimates accounting for prior-applied multipliers provided to each potential requestor, and conversion rates of potential requestors who submit transportation requests. The third machine learner then applies an algorithm to these inputs to generate conversion parameters, such as by applying a Kalman filter to the inputs. In some embodiments, the third machine learner generates a conversion parameter representing a transportation-request probability of receiving a transportation request when the multiplier does not affect a base price for the geographic area during the time period and a conversion parameter representing a rate at which the transportation-request probability decreases as the multiplier increases. In certain embodiments, the first machine learner uses online machine learning to update the conversion parameters as it determines updated inputs for additional time periods.

As noted above, the disclosed dynamic transportation matching system determines a multiplier for a geographic area and a time period. In some embodiments, the dynamic transportation matching system inputs the efficiency parameters, supply parameters, and conversion parameters into a multiplier model. Based on these parameters, the multiplier model determines a multiplier for the geographic area and time period. This multiplier affects the price estimates that the dynamic transportation matching system sends to potential requestors of transportation. For example, the dynamic transportation matching system applies the multiplier to a base price for a geographic area when providing a price estimate to potential requestors of a transportation vehicle.

The dynamic transportation matching system also optionally uses the multiplier in a multiplier report to facilitate the movement of transportation vehicles in and out of a geographic area. For example, in certain embodiments, the dynamic transportation matching system generates a multiplier report comprising a representation of the geographic area and an indication of the multiplier. In one particular embodiment, the dynamic transportation matching system generates a map for transportation vehicles comprising a representation of the geographic area and a color indicator for the multiplier for the geographic area. Whether the indicator for the multiplier be color or some other indicator, the indicator signals to providers the multiplier that the dynamic transportation matching system applies to a base price when the dynamic transportation matching system charges a requestor for transportation originating from the geographic area.

As also noted above, conventional on-demand service matching systems often use static computational models that are ill suited to match requests with transportation vehicles. Static computational models are particularly inefficient at matching requests with transportation vehicles when either transportation vehicles (or transportation requests) unexpectedly vary or rapidly increase. For example, when a conventional on-demand service matching system receives instantaneous or near-instantaneous requests from persons seeking transportation, some static computational models cannot handle high or fluctuating volumes of requests while also maintaining target estimated arrival times within a geographic area. In particular, a static computational model may use static parameters that a conventional on-demand service matching system cannot update to determine a multiplier applied to a base price for a specific geographic area.

The disclosed dynamic transportation matching system, however, avoids the limits and rigidity of conventional on-demand service matching systems. By using multiple machine learners to dynamically generate and adjust computational parameters, the disclosed dynamic transportation matching system determines a multiplier that facilitates an efficient allocation of transportation vehicles and maintains target estimated times of arrival. When transportation requests reach high volumes or available transportation vehicles unexpectedly decrease, the disclosed dynamic transportation matching system uses the machine learners to adjust parameters and produce a multiplier to apply to a base price for a specific geographic area. Unlike the inflexible parameters of a static computational model, the machine learners of the disclosed dynamic transportation matching system dynamically adjust parameters for different time periods.

Turning now to the figures, FIG. 1 illustrates a schematic diagram of an environment 100 for implementing a dynamic transportation matching system 102 in accordance with one or more embodiments. This disclosure provides an overview of the dynamic transportation matching system 102 with reference to FIG. 1. After providing an overview, the disclosure describes components and processes of the dynamic transportation matching system 102 in further detail with reference to subsequent figures.

As shown in FIG. 1, the environment 100 includes the dynamic transportation matching system 102, vehicle subsystems 108a through 108n, requestor client devices 114a through 114n, requestors 118a through 118n, and a network 120. The dynamic transportation matching system 102 uses server(s) 104 to communicate with one or both of the vehicle subsystems 108a-108n and the requestor client devices 114a-114n via the network 120. For example, the dynamic transportation matching system 102 communicates with the provider client devices 110a-110n and the requestor client devices 114a-114n via the network 120 to determine locations of the provider client devices 110a-110n and the requestor client devices 114a-114n, respectively. Per device settings, for instance, the dynamic transportation matching system 102 may receive location coordinates from the provider client devices 110a-110n and/or the requestor client device 114a-114n, respectively. Based on the location coordinates, the dynamic transportation matching system 102 determines the geographic area in which the provider client devices 110a-110n and/or the requestor client devices 114a-114n are located.

Figure 3B:
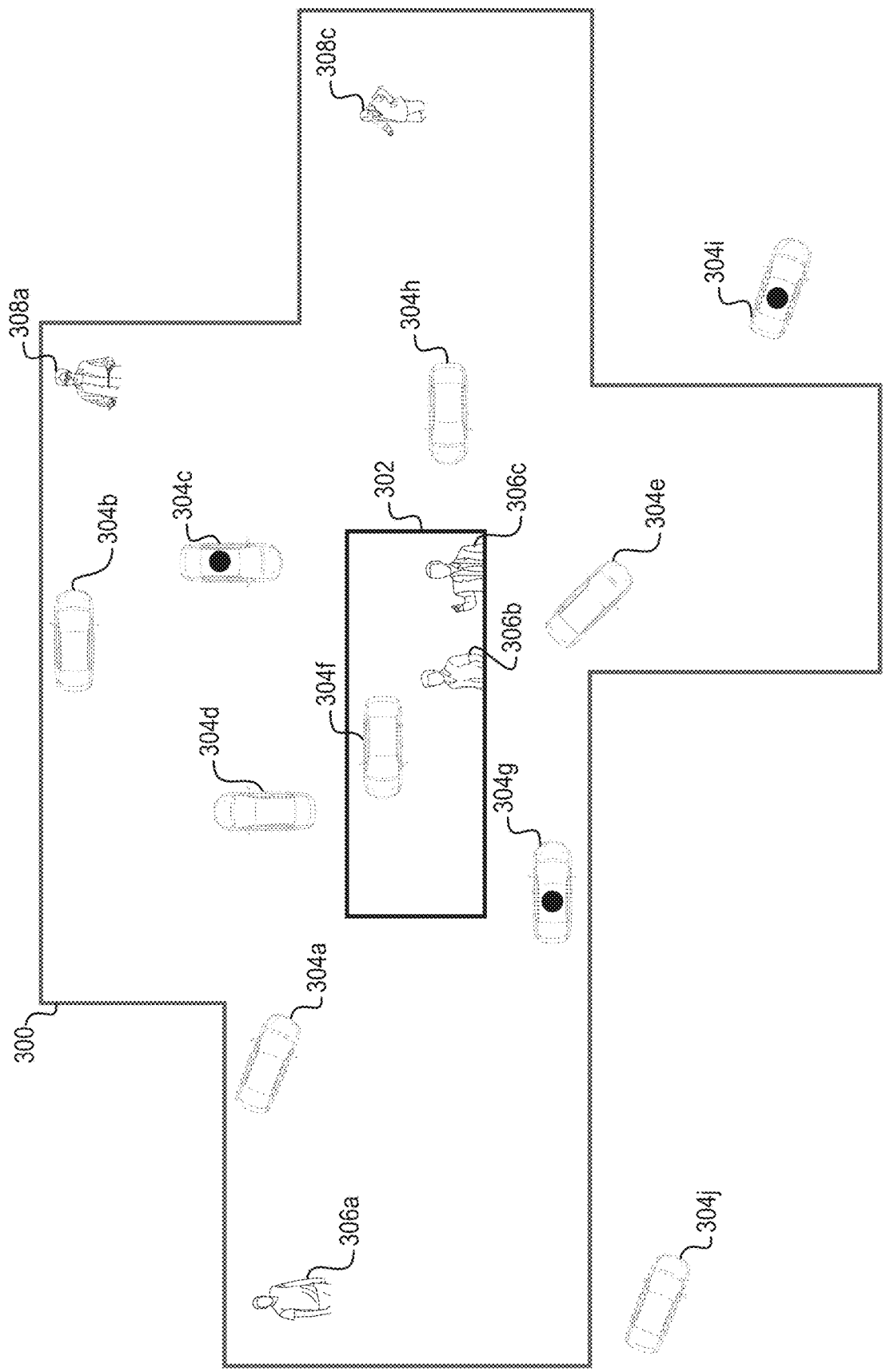

As used in this disclosure, the term "geographic area" refers to a spatial subdivision or unit of a larger geographic space. A geographic area may be a subdivision of a geographic neighborhood as well as a subdivision of a city. For example, a set of bordering streets may define a geographic area within a larger space, such as Chinatown of San Francisco, California or Tribeca of New York City, New York. In certain embodiments, a geographic area represents a geohash among other geohashes in a grid covering a larger geographic space. Relatedly, the term "geographic neighborhood" refers to a geographic region that includes multiple geographic areas. Regardless of the form of a geographic area, one or more requestors or providers may be located within a geographic area. As described below, FIGS. 3A and 3B depict an example of a geographic area.

The term "requestor" refers to person (or group of people) who request a ride or other form of transportation from a dynamic transportation matching system. A requestor may refer to a person who requests a ride or other form of transportation but who is still waiting for pickup. A requestor may also refer to a person whom a transportation vehicle has picked up and who is currently riding within the transportation vehicle to a destination (e.g., a destination indicated by a requestor). As shown in FIG. 1, each of the requestors 118a-118n are respectively associated with the requestor client devices 114a-114n.

Accordingly, the term "requestor client device" refers to a computing device associated with a requestor or (as explained below) a potential requestor. A requestor client device includes a mobile device, such as a laptop, smartphone, or tablet associated with a requestor. But the requestor client devices 114a-114n may be any type of computing device as further explained below with reference to FIG. 7. Each of the requestor client devices 114a-114n respectively include requestor applications 116a-116n. In some embodiments, the requestor applications 116a-116n comprise web browsers, applets, or other software applications (e.g., native applications) available to the requestor client devices 114a-114n. Additionally, in some instances, the dynamic transportation matching system 102 provides data packets including instructions that, when executed by the requestor client devices 114a-114n, create or otherwise integrate provider applications 112a-112n within an application or webpage.

A requestor may use a requestor application to request transportation services, receive a price estimate for the transportation service, and access other transportation-related services. For example, the requestor 118a may interact with the requestor client device 114a through graphical user interfaces of the requestor application 116a to enter a pickup location and a destination for transportation. The dynamic transportation matching system 102 can in turn provide the requestor client device 114a with a price estimate for the transportation and an estimated time of arrival of a provider (or transportation vehicle) through the requestor application 116a. Having received the price estimate, the requestor 118a may then select (and the requestor client device 114a detect) a selection of a transportation-request option to request transportation services from the dynamic transportation matching system 102.

Relatedly, the term "potential requestor" refers to a person who opens or initiates a software application of the dynamic transportation matching system 102 and whose requestor client device sends a query for a price estimate and/or a query for an estimated time of arrival. Accordingly, a potential requestor enters in a pickup location and destination for transportation (and optionally selects a transportation type) by interacting with graphical user interfaces of a requestor application. In some embodiments, the potential requestor's associated requestor client device automatically sends a query for a price estimate (or a "price query") and/or a query for an estimated time of arrival (or "arrival query") to the dynamic transportation matching system 102 upon detecting a pickup location and destination for a potential transportation service (and sometimes a transportation type). In some such embodiments, a requestor client device sends a price query and arrival query together to the dynamic transportation matching system 102, such as two queries encoded within data packets sent to the dynamic transportation matching system 102.

Additionally, or alternatively, the potential requestor's associated requestor client device sends a price query and/or an arrival query to the dynamic transportation matching system 102 upon detecting a selection by the potential requestor for a price estimate. Although FIG. 1 depicts and this disclosure often refers to the requestors 118a and 118n as "requestors," each of the requestors 118a and 118n were at one point "potential requestors." To be clear, some potential requestors do not send a transportation request. To differentiate between the stage at which a person may be in requesting transportation, this disclosure differentiates between the terms "requestor" and "potential requestor."

As just noted, the dynamic transportation matching system 102 optionally provides an estimated time of arrival to a requestor client device in response to an arrival query. The term "estimated time of arrival" refers to a time by which the dynamic transportation matching system 102 estimates a transportation vehicle will arrive to pick up a requestor. For example, the dynamic transportation matching system 102 may provide an estimated time of arrival of five minutes to the requestor client device 114a for the requestor 118a in response to an arrival query from the requestor client device 114a. Relatedly, the term "target estimated time of arrival" refers to a time set by or given to the dynamic transportation matching system 102 by which the dynamic transportation matching system 102 estimates a transportation vehicle will arrive to pick up a requestor. For example, the dynamic transportation matching system 102 may set a target estimated time of arrival according to a policy or service-level agreement that applies to a geographic area, geographic neighborhood, or larger geographic space.

As further shown in FIG. 1, the dynamic transportation matching system 102 sends requests from requestors 118a-118n to provider client devices 110a-110n within a vehicle subsystem. The term "vehicle subsystem" refers to a system comprising a vehicle, client device, and other components. For example, a vehicle subsystem includes a transportation vehicle (not shown) and a provider client device, such as the provider client device 110a. The transportation vehicle may be an airplane, automobile, bicycle, motorcycle, or other vehicle. Although this disclosure often describes a transportation vehicle as performing certain functions, the transportation vehicle includes an associated provider client device that often performs a corresponding function. For example, when the dynamic transportation matching system 102 sends a transportation request to a transportation vehicle within the vehicle subsystem 108a—or queries location information from a transportation vehicle within the vehicle subsystem 108a—the dynamic transportation matching system 102 sends the transportation request or location query to the provider client device 110a.

Relatedly, the term "provider" refers to a driver or other person who operates a transportation vehicle and/or who interacts with a provider client device. For instance, a provider includes a person who drives a transportation vehicle along various routes to pick up and drop off requestors. In certain embodiments, the vehicle subsystems 108a-108n include a provider. However, in other embodiments, some or all of the vehicle subsystems 108a-108n do not include a provider, but include autonomous transportation vehicles—that is, a self-driving vehicle that includes computer components and accompanying sensors for driving without manual-provider input from a human operator. When a transportation vehicle is an autonomous vehicle, the transportation vehicle may include additional components not depicted in FIG. 1, such as location components, one or more sensors by which the autonomous vehicle navigates, and/or other components necessary to navigate without a provider (or with minimal interactions with a provider).

Additionally, in some embodiments, one or more of the vehicle subsystems 108a-108n include a hybrid self-driving vehicle with both self-driving functionality and some human operator interaction. This human operator interaction may work in concert with or independent of the self-driving functionality. In other embodiments, one or more of the vehicle subsystems 108a-108n include an autonomous provider that acts as part of the transportation vehicle, such as a computer-based navigation and driving system that acts as part of a transportation vehicle. Regardless of whether a transportation vehicle associated with a provider, a transportation vehicle optionally includes a locator device, such as a GPS device, that determines the location of the transportation vehicle within the vehicle subsystems 108a-108n.

As mentioned above, the vehicle subsystems 108a-108n respectively include provider client devices 110a-110n. The provider client devices 110a-110n may be separate or integral to transportation vehicles. For example, the provider client device 110a may refer to a separate mobile device, such as a laptop, smartphone, or tablet associated with the vehicle subsystem 108a. But the provider client devices 110a-110n may be any type of computing device as further explained below with reference to FIG. 7. Additionally, or alternatively, the provider client device 110a may be a subcomponent of a vehicle computing system. Regardless of its form, the provider client devices 110a-110n may include various sensors, such as a GPS locator, an inertial measurement unit, an accelerometer, a gyroscope, a magnetometer, and/or other sensors that the dynamic transportation matching system 102 can access to obtain information, such as location information.

As further shown in FIG. 1, the provider client devices 110a-110n respectively include provider applications 112a-112n. In some embodiments, the provider applications 112a-112n comprise web browsers, applets, or other software applications (e.g., native applications) available to the provider client devices 110a-110n. Additionally, in some instances, the dynamic transportation matching system 102 provides data packets including instructions that, when executed by the provider client devices 110a-110n, create or otherwise integrate provider applications 112a-112n within an application or webpage.

In some embodiments, the dynamic transportation matching system 102 communicates with the provider client devices 110a-110n through the provider applications 112a-112n. Additionally, the provider applications 112a-112n optionally include computer-executable instructions that, when executed by the provider client devices 110a-110n, cause the provider client devices 110a-110n to perform certain functions. For instance, the provider applications 112a-112n can cause the provider client devices 110a-110n to communicate with the dynamic transportation matching system 102 to navigate to a pickup location to pick up a requestor, collect fares, and/or view a multiplier report.

As described further below with reference to FIG. 8, in certain embodiments, the dynamic transportation matching system 102 connects transportation requests with transportation vehicles. By connecting requests with transportation vehicles, the dynamic transportation matching system 102 manages the distribution and allocation of vehicle subsystems 108a-108n and other user resources, such as GPS location and availability indicators. To facilitate connecting requests with transportation vehicles, the dynamic transportation matching system 102 communicates with the provider client devices 110a-110a (through the provider applications 112a-112n) and with the requestor client devices 114a-114n (through the requestor applications 116a-116n). For example, the dynamic transportation matching system 102 uses machine learners to determine a multiplier for a geographic area and a time period and sends multiplier reports to the provider client devices 110a-110n that reflect the multiplier. Additionally, or alternatively, in response to price queries and/or arrival queries, the dynamic transportation matching system 102 respectively sends price estimates and/or estimated times of arrival to the requestor client devices 114a-114n, where the price estimates reflect the multiplier.

As used in this disclosure, the term "multiplier" refers to a factor by which a base price is multiplied. The term "base price" in turn refers to a price for transportation that a dynamic transportation matching system assigns or designates for transportation services originating in a geographic area, such as a base price per mile and/or per time unit for transportation services originating in a geographic area. In some embodiments, the multiplier refers to a percentage or other number by which a base price for a geographic area is multiplied.

Relatedly, the term "time period" refers to an interval of time determined or set by the dynamic transportation matching system 102. A time period may be any time interval, including, but not limited to, a one-minute interval and a one-hour interval. For example, a time period may be a one-minute interval from 2:15 p.m. to 2:16 p.m. on Thursday, Jun. 14, 2018. As another example, a time period may be a five-minute interval from 5:00 p.m. to 5:15 p.m. on Sunday, Feb. 4, 2018. In some embodiments, for example, the dynamic transportation matching system 102 sets a time period for which to collect data, such as location information, price estimates, estimated times of arrival, number of available transportation vehicles, number of transportation requests, and other relevant data. In some such embodiments, the dynamic transportation matching system 102 collects and organizes the data by time period and geographic area and/or geographic neighborhood. As noted above, the dynamic transportation matching system 102 determines a multiplier for a specific geographic area and a time period.

For example, in one embodiment, the dynamic transportation matching system 102 determines that a multiplier for a geographic area and a current time period is 15%. To notify providers of the multiplier for the geographic area, the dynamic transportation matching system 102 provides a multiplier report to the provider client devices 110a-110n with an indication of the multiplier. The dynamic transportation matching system 102 may also provide price estimates that account for the multiplier to the requestor client devices 114a-114n during the time period upon receiving a price query.

Figure 4:
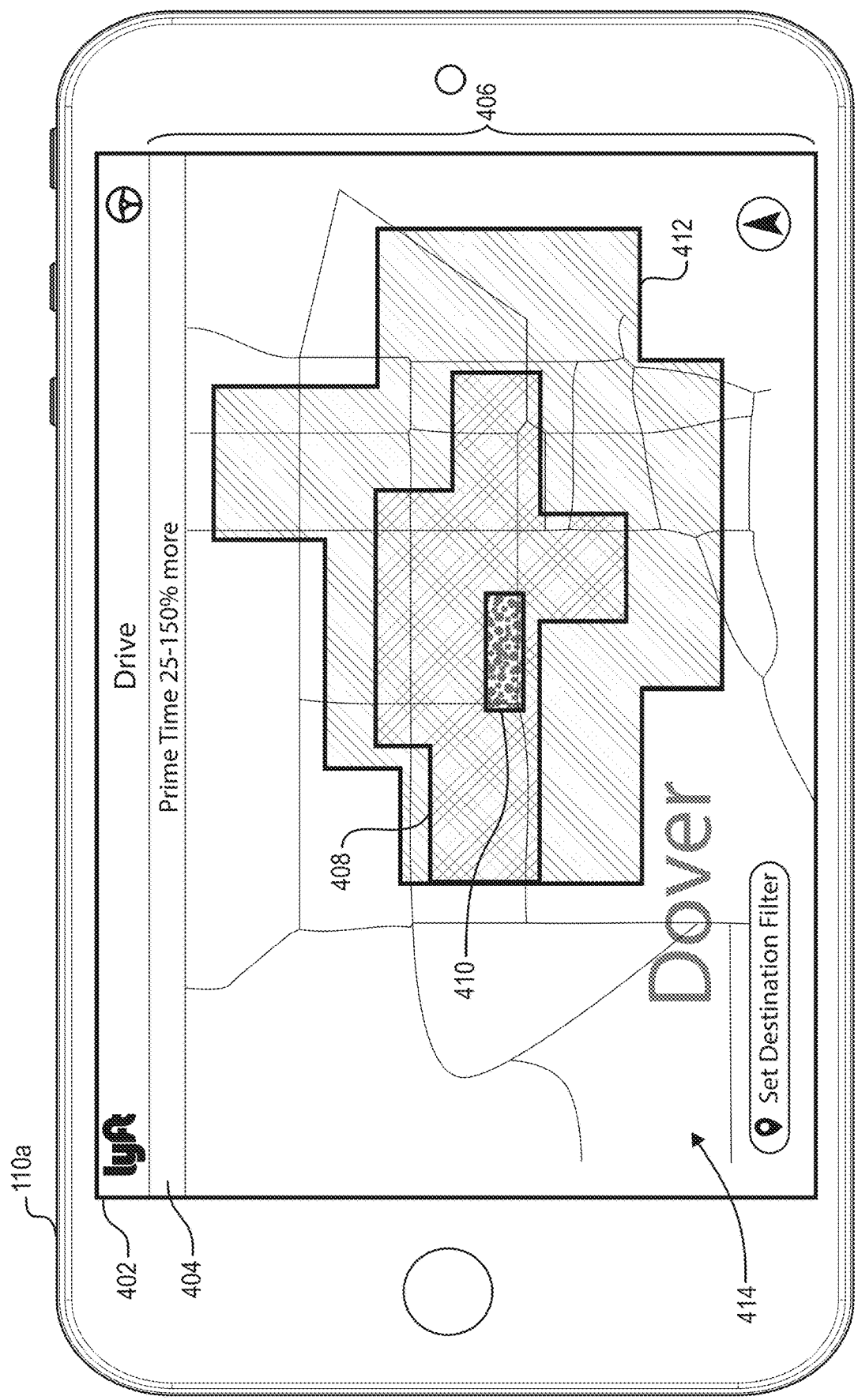
FIG. 4 illustrates a graphical user interface of a provider client device presenting a multiplier report in accordance with one or more embodiments.

As used in this disclosure, the term "multiplier report" refers to a report that includes representations of one or more geographic areas and indications of the multiplier for the geographic areas. For example, a multiplier report may include a representation of multiple geographic areas and color indicators representing the multiplier for each geographic area (e.g., a different shade of pink representing a different multiplier determined for each geographic area). As described below, FIG. 4 depicts an example of a multiplier report.

The term "price estimate" refers to an estimated price for transportation. The dynamic transportation matching system 102 optionally provides a price estimate that accounts for a multiplier to one of the requestor client devices 114a-114n. For example, when the dynamic transportation matching system 102 receives a price query from the requestor client device 114a for transportation, the dynamic transportation matching system 102 sends a price estimate to the requestor client device 114a. Assuming that a base price for the transportation service is $3.00, for example, the dynamic transportation matching system 102 optionally multiplies the base price by the multiplier (e.g., 15%) and adds the product (e.g., $0.45) to the base price. In this example, the dynamic transportation matching system 102 would generate a price estimate (e.g., $3.45) for delivery to the requestor client device 114a.

As explained further below, the dynamic transportation matching system 102 trains machine learners to determine a multiplier. When training machine learners, the dynamic transportation matching system 102 optionally inputs data stored on a transportation matching database 106 accessed by the server(s) 104. Accordingly, the server(s) 104 may generate, store, receive, and transmit any type of data, such as location information, price estimates, estimated times of arrival, number of available transportation vehicles for a geographic area, and other data stored in the transportation matching database 106. In some such embodiments, the dynamic transportation matching system 102 organizes and stores such data in the transportation matching database 106 by geographic area and time period. Additionally, in certain embodiments, the dynamic transportation matching system 102 organizes and stores such data in the transportation matching database 106 by aggregate geographic area and time period.

As shown in FIG. 1, the server(s) 104 may comprise a content server. The server(s) 104 can also comprise a communication server or a web-hosting server. Additional details regarding the server(s) 104 will be discussed below with respect to FIG. 7. Although not illustrated in FIG. 1, in some embodiments, the environment 100 may have a different arrangement of components and/or may have a different number or set of components altogether. For example, in some embodiments, the dynamic transportation matching system 102 and the provider client devices 110a-110n can communicate directly, bypassing the network 120.

Figure 2:
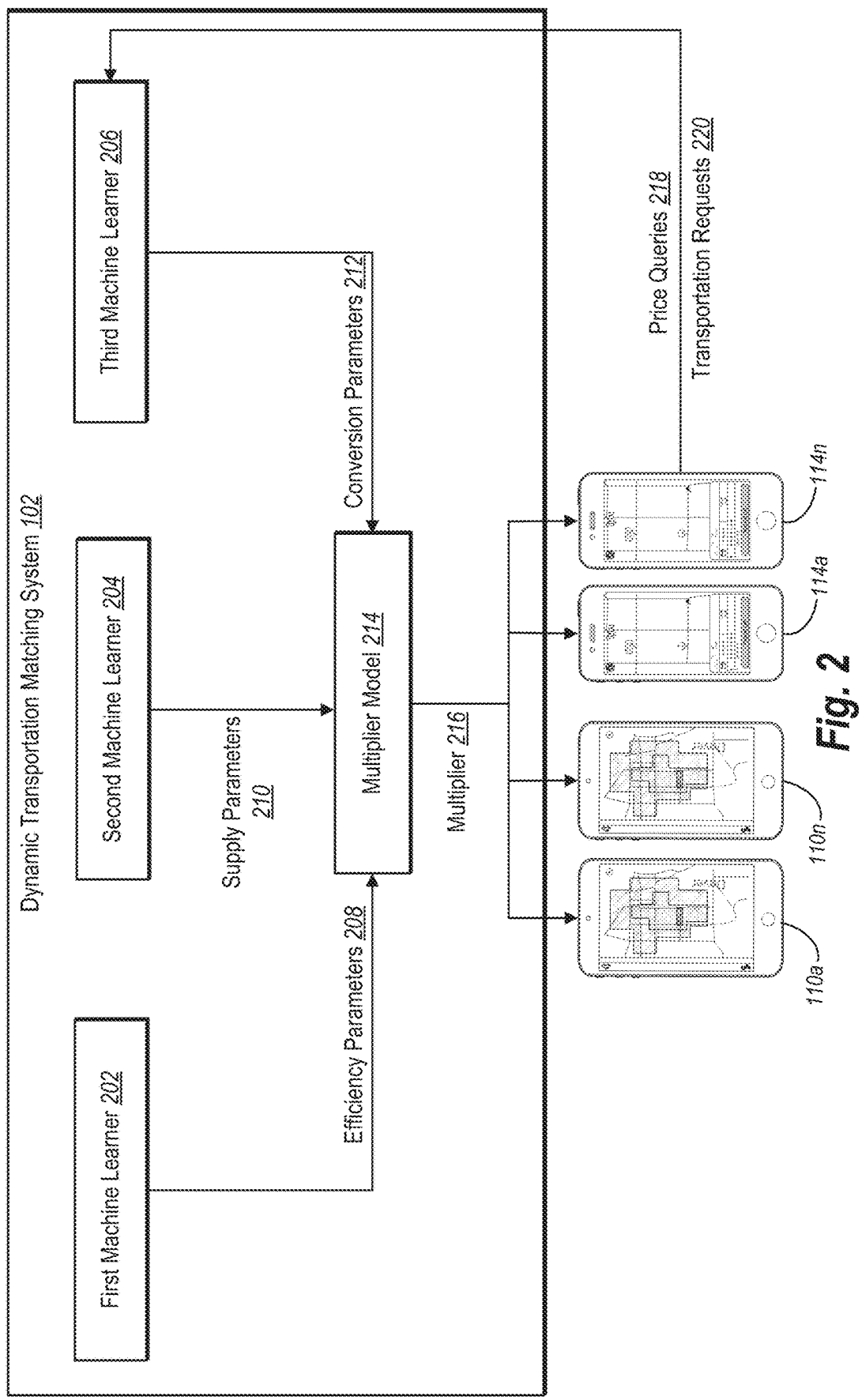
FIG. 2 illustrates a dynamic transportation matching system comprising machine learners and generating multiplier reports in accordance with one or more embodiments.

Turning now to FIG. 2, this figure illustrates certain components of the dynamic transportation matching system 102. As noted above, the dynamic transportation matching system 102 uses machine learners to dynamically generate and adjust a multiplier for a geographic area and a time period. To make such a determination, the dynamic transportation matching system 102 trains each machine learner with either one or both of historical transportation matching data and updated transportation matching data. The dynamic transportation matching system 102 inputs the historical transportation matching data and/or updated transportation matching data into the machine learners to generate various parameters, including efficiency parameters, supply parameters, and/or conversion parameters.

The dynamic transportation matching system 102 also optionally uses updated transportation matching data as it becomes available for each passing time period. In other words, in some embodiments, the dynamic transportation matching system 102 continually inputs updated transportation matching data to dynamically adjust a set of parameters for a subsequent time period of a geographic area. As part of the learning process, the machine learners adjust parameters by iteratively comparing the parameters they generate to observed transportation matching data. In some such embodiments, the dynamic transportation matching system 102 uses online machine learners that use freshly updated transportation matching data to adjust parameters.

As shown in FIG. 2, the dynamic transportation matching system 102 includes a first machine learner 202, a second machine learner 204, and a third machine learner 206. Each of the machine learners 202-206 generate parameters that a multiplier model 214 uses as inputs. The multiplier model 214 uses the parameters to determine a multiplier 216 for a geographic area and a time period. Having determined the multiplier 216, in some embodiments, the dynamic transportation matching system 102 sends a multiplier report including a representation of the multiplier 216 to the provider client devices 110a-110n. Additionally, or alternatively, in certain embodiments, the dynamic transportation matching system 102 sends price estimates accounting for the multiplier 216 to the requestor client devices 114a-114n.

When generating parameters, each of the machine learners 202-206 iteratively generates parameters specific to a target geographic area and target time period. In other words, the machine learners 202-206 use transportation matching data for a geographic area and a time period to create each iteration of their respective parameters. Accordingly, when identifying the relevant transportation matching data for one of the machine learners 202-206, the dynamic transportation matching system 102 determines certain quantities associated with both the geographic area and the relevant time period.

For example, if the relevant time period is 12:06 to 12:07 a.m. on Monday, Jan. 1, 2018, the dynamic transportation matching system 102 determines certain quantities of transportation matching data for a specific geographic area (e.g., Chinatown North Beach) from 12:06 to 12:07 on prior New Year's Days (e.g., the last five New Year's Days) and for several minutes immediately preceding the time period. In other examples, the dynamic transportation matching system 102 uses transportation matching data associated with time periods representing one-minute increments, fifteen-minute increments, or other time increments on a day of the week of a specific month (e.g., the second Friday in September). Additionally, in some embodiments, the dynamic transportation matching system 102 also uses transportation matching data associated with both a time period for an annual date (e.g., New Year's Day, Valentine's Day, Fourth of July) and a day of a week (e.g., first Monday in January second Wednesday in February first Wednesday in July).

As suggested above, the dynamic transportation matching system 102 optionally comprises computer-executable instructions that cause the server(s) 104 to perform one or more of the acts associated with the first machine learner 202, second machine learner 204, third machine learner 206, and multiplier model 214. Rather than repeatedly describe the instructions within the dynamic transportation matching system 102 as causing the server(s) 104 to perform certain acts, this disclosure primarily describes the first machine learner 202, second machine learner 204, third machine learner 206, and multiplier model 214 as performing the acts as a shorthand for those relationships.

Turning now to the machine learners, the first machine learner 202 generally uses historical or updated transportation matching data to map transportation vehicles' target estimated times of arrival to reserve transportation vehicles. As used in this disclosure, the term "reserve transportation vehicle" refers to a transportation vehicle that is both available to pick up a requestor in response to a transportation request but that does not ultimately pick up a requestor during a specific time period. The first machine learner 202 seeks to determine numbers of reserve transportation vehicles for one time period to ensure that a geographic area includes available transportation vehicles during an immediately following time period. In other words, the reserve transportation vehicles for one time period may become the available transportation vehicles for a subsequent time period. Without available transportation vehicles within a geographic area, the dynamic transportation matching system 102 may find it difficult or impossible to maintain estimated times of arrival for pickup of a requestor in the geographic area.

Similarly, the term "available transportation vehicle" refers to a transportation vehicle available to pick up a requestor in response to a transportation request. In some embodiments, an available transportation vehicle does not include a requestor. By contrast, in certain embodiments, an available transportation vehicle includes at least one requestor, but the transportation vehicle may pick up additional requestors (e.g., as permitted by a transportation type selected by the requestor). Because the term "available transportation vehicle" does not depend on whether a transportation vehicle ultimately picks up a requestor during a specific time period, a certain number of available transportation vehicles may include reserve transportation vehicles.

To map target estimated times of arrival to available transportation vehicles, the first machine learner 202 learns to generate efficiency parameters 208 that define an arrival-time probability distribution of a number of reserve transportation vehicles that are required to maintain a target estimated time of arrival for a geographic area and a time period. The arrival-time probability distribution indicates a likelihood that a certain number of reserve transportation vehicles (for a geographic area during a time period) will maintain a target estimated time of arrival that the dynamic transportation matching system 102 provides to a potential requestor (for the geographic area during the time period). In some embodiments, the first machine learner 202 learns to generate the efficiency parameters 208 that define the arrival-time probability distribution of the number of reserve transportation vehicles required to maintain a target estimated time of arrival within a target percentile (e.g., 65%, 75%, 85%) for the geographic area and the time period. As used in this disclosure, the term "target percentile" refers to a predetermined probability that the dynamic transportation matching system 102 uses to measure confidence that a target is obtained, such as maintaining a target estimated time of arrival.

As suggested above, each iteration of the efficiency parameters 208 and the arrival-time probability distribution is specific to the geographic area and the time period. In other words, the first machine learner 202 uses transportation matching data for a geographic area and a time period to create each iteration of the arrival-time probability distribution. Accordingly, when identifying the relevant transportation matching data for the first machine learner 202, the dynamic transportation matching system 102 determines certain quantities associated with both the geographic area and the relevant time period.

When training the first machine learner 202 to generate the efficiency parameters 208, the dynamic transportation matching system 102 optionally determines (and then inputs) transportation matching data for certain time periods of a specific geographic area. For example, as a first input for the first machine learner 202, the dynamic transportation matching system 102 optionally determines a number of available transportation vehicles during prior time periods. As suggested above, the dynamic transportation matching system 102 may determine a number of available transportation vehicles for a geographic area during each of various prior time periods associated with a current or subsequent time period (e.g., time periods on or within several days of the same annual date and/or day of the week). As a second input for the first machine learner 202, the dynamic transportation matching system 102 optionally determines estimated times of arrival provided to potential requestors within the geographic area during prior time periods. Again, the dynamic transportation matching system 102 may determine estimated times of arrival provided to potential requestors within the geographic area during each of various prior time periods associated with a current or subsequent time period.

As additional time periods approach or pass, in some embodiments, the dynamic transportation matching system 102 determines updated inputs for the first machine learner 202. For example, as a subsequent time period begins, the dynamic transportation matching system 102 determines, as an updated first input for the first machine learner 202, an updated number of available transportation vehicles for the geographic area during the subsequent time period. Additionally, after the relevant time period passes, the dynamic transportation matching system 102 determines, as an updated second input for the first machine learner 202, updated estimated times of arrival provided to potential requestors within the geographic area during the time period. In other words, the dynamic transportation matching system 102 optionally continues to input transportation matching data as each time period passes (e.g., minute by minute, hour by hour).

Having received inputs from the dynamic transportation matching system 102, the first machine learner 202 applies an algorithm to the inputs to generate the efficiency parameters 208. For example, in some embodiments, the first machine learner 202 applies a stochastic gradient descent to the inputs. In some such embodiments, the first machine learner 202 applies a lognormal-maximum-likelihood function to the inputs when performing a stochastic gradient descent. Alternatively, in some embodiments, the first machine learner 202 applies another suitable algorithm to the inputs to generate the efficiency parameters 208. Such algorithms may include Kalman filters; Particle filters, which are sometimes called Sequential Monte Carlo ("SMC") methods; Monte Carlo simulations, such as Markov chain Monte Carlo ("MCMC"); or Hidden Markov Models ("HMM").

By applying an algorithm, the first machine learner 202 generates the efficiency parameters 208 for the multiplier model 214. For example, the first machine learner 202 generates a first efficiency parameter representing a mean for the arrival-time probability distribution, a second efficiency parameter representing a variance for the arrival-time probability distribution, and a third efficiency parameter estimating a number of available transportation vehicles outside of an aggregation radius but inside a dispatch radius. As suggested above, the first machine learner 202 uses the first efficiency parameter, the second efficiency parameter, and the third efficiency parameter as variables within a lognormal-maximum-likelihood function that estimates an arrival-time probability distribution.

As used in this disclosure, the term "aggregation radius" refers to a geographic neighborhood comprising all geographic areas within a predetermined travel time from a specific geographic area. For example, an aggregation radius may include all geographic areas within 8 or 10 minutes travel time from a geographic area of interest. Relatedly, the term "dispatch radius" refers to a geographical radius comprising locations within a larger predetermined travel time from a specific geographic area. For example, a dispatch radius may include locations within 15 or 20 minutes travel time from a geographic area of interest. Accordingly, a dispatch radius includes and often encompasses an aggregation radius. Moreover, when available transportation vehicles are outside of an aggregation radius—but inside a dispatch radius—the available transportation vehicles are within the comparatively larger radius for a geographic area, but not within the comparatively smaller radius for the geographic area.

As noted above, in certain embodiments, the first machine learner 202 uses online machine learning to update the efficiency parameters 208 as it determines updated inputs for additional time periods. As part of training the first machine learner 202, in some embodiments, the first machine learner 202 compares the efficiency parameters 208 it generates for a time period to the observed transportation matching data for the same time period as that data becomes available. By comparing the efficiency parameters 208 to observed transportation matching data, the first machine learner 202 learns how to generate more accurate efficiency parameters 208 in subsequent iterations.

For example, the first machine learner 202 may compare the first, second, and third efficiency parameters (for a geographic area and a time period) to observed numbers of reserve transportation vehicles and observed estimated times of arrival provided to potential requestors (for the geographic area and the time period). By making this comparison, the first machine learner 202 determines the accuracy of the efficiency parameters 208 that define an arrival-time probability distribution of a number of reserve transportation vehicles required to maintain a target estimated time of arrival for the geographic area and the time period. When the efficiency parameters 208 define an arrival-time probability distribution inconsistent with the observed numbers of reserve transportation vehicles and observed estimated times of arrival provided to potential requestors, the first machine learner 202 updates the efficiency parameters 208 to be more accurate and accounts for this adjustment in future iterations of the efficiency parameters 208.

Turning now to the next machine learner, the second machine learner 204 generally uses historical or updated transportation matching data to map reserve transportation vehicles to numbers of transportation requests. As used in this disclosure, the term "number of transportation requests" refers to a number of requests for rides or for other forms of transportation in transportation vehicles that the dynamic transportation matching system 102 can receive and still maintain a number of reserve transportation vehicles (e.g., in a geographic area).

To map reserve transportation vehicles to numbers of transportation requests, the second machine learner 204 learns to generate supply parameters 210 that define a number of transportation requests a dynamic transportation matching system can process while maintaining the number of reserve transportation vehicles for the geographic area and the time period. In other words, when used in a function, the supply parameters 210 define how many transportation requests the dynamic transportation matching system 102 can receive and—in response—provide a transportation vehicle (for a geographic area during a time period) while still maintaining a certain number of reserve transportation vehicles (for a geographic area during a time period). In some embodiments, the second machine learner 204 uses the number of reserve transportation vehicles identified by the arrival-time probability distribution (from the first machine learner 202) to generate the supply parameters 210.

As suggested above, each iteration of the supply parameters 210 is specific to the geographic area and the time period. In particular, the second machine learner 204 uses transportation matching data for a geographic neighborhood that includes the geographic area and a time period to create each iteration of the supply parameters 210. Accordingly, when identifying the relevant transportation matching data for the second machine learner 204, the dynamic transportation matching system 102 determines certain quantities associated with both the geographic neighborhood and the relevant time period.

When training the second machine learner 204 to generate the supply parameters 210, the dynamic transportation matching system 102 optionally determines (and then inputs) transportation matching data for certain time periods of a specific geographic neighborhood, where the geographic neighborhood includes a relevant geographic area. For example, as a first input for the second machine learner 204, the dynamic transportation matching system 102 optionally determines a number of transportation requests for a geographic neighborhood during prior time periods. In some such embodiments, the dynamic transportation matching system 102 determines a number of transportation requests for each of various prior time periods relevant to a current time period (e.g., time periods on or within several days of the same annual date and/or day of the week) for transportation originating in a geographic neighborhood. As a second input for the second machine learner 204, the dynamic transportation matching system 102 optionally determines a number of available transportation vehicles for the geographic neighborhood during prior time periods. In some cases, the dynamic transportation matching system 102 determines a number of available transportation vehicles for the geographic neighborhood during each of various prior time periods relevant to a current time period (e.g., time periods on or within several days of the same annual date and/or day of the week).

As additional time periods approach or pass, in some embodiments, the dynamic transportation matching system 102 determines updated inputs for the second machine learner 204. For example, as the relevant time period passes, the dynamic transportation matching system 102 determines, as an updated first input for the second machine learner 204, an updated number of transportation requests for a geographic neighborhood during the time period. Additionally, after the relevant time period passes, the dynamic transportation matching system 102 determines, as an updated second input for the second machine learner 204, an updated number of available transportation vehicles for the geographic neighborhood during the time period. In other words, as with the first machine learner 202 above, the dynamic transportation matching system 102 optionally continues to input transportation matching data into the second machine learner 204 as each time period passes (e.g., minute by minute, hour by hour).

Having received inputs from the dynamic transportation matching system 102, the second machine learner 204 applies an algorithm to the inputs to generate the supply parameters 210. For example, in some embodiments, the second machine learner 204 applies a Kalman filter to the inputs. Alternatively, in some embodiments, the second machine learner 204 applies another algorithm to the inputs to generate the supply parameters 210. Such algorithms may include stochastic gradient descent; Particle filters, which are sometimes called Sequential Monte Carlo ("SMC") methods; Monte Carlo simulations, such as Markov chain Monte Carlo ("MCMC"), or Hidden Markov Models ("HMM").

By applying an algorithm, the second machine learner 204 generates the supply parameters 210 for the multiplier model 214. For example, the second machine learner 204 generates a first supply parameter representing an estimated net inflow of transportation vehicles into a geographic neighborhood during the time period, where the geographic neighborhood includes the relevant geographic area. Additionally, the second machine learner 204 generates a second supply parameter representing an estimated average number of transportation requests a transportation vehicle can support for the geographic neighborhood during the time period.

In some embodiments, the first and second supply parameters represent point estimates of stochastic variables. As a point estimate, the first supply parameters may be considered a mean of a corresponding distribution for net inflow of transportation vehicles in a geographic neighborhood during the time period. Again, as a point estimate, the second supply parameter may be considered a mean of a corresponding distribution of transportation requests a transportation vehicle can support for the demographic neighborhood during the time period.

When generating the supply parameters 210, the second machine learner 204 optionally uses a supply equation. In general, according to the supply equation, the number of available transportation vehicles at time one (t) plus time two (dt) equals the number of available transportation vehicles at time one (t) with the subtraction of the product of the second supply parameter and the number of transportation requests for the geographic neighborhood with the addition of the first supply parameter. In some embodiments, time one (t) plus time two (dt) together represent a time period, such as the change from time one (12:15 p.m.) to time two (12:16 p.m.).

Specifically, in the supply equation, a number of available transportation vehicles at time one (1) plus time two (dt) equals the sum of the number of available transportation vehicles at time one (t) and the inflow of available transportation vehicles in between time one (t) and time two (dt) with the subtraction of the outflow of available transportation vehicles between time one (t) and time two (dt). Using the supply equation, the number of providers who accept transportation requests equals the product of the first supply parameter and the number of transportation requests for a geographic neighborhood. Additionally, the second supply parameter equals the sum of the inflow of available transportation vehicles in between time one (t) and time two (dt) and the outflow of available transportation vehicles between time one (t) and time two (dt). Accordingly, the number of available transportation vehicles at time one (t) plus time two (dt) equals the number of available transportation vehicles at time one (t) with the subtraction of the product of the second supply parameter and the number of transportation requests for the geographic neighborhood with the addition of the first supply parameter.

As noted above, in certain embodiments, the second machine learner 204 uses online machine learning to update the supply parameters 210 as it determines updated inputs for additional time periods. As part of training the second machine learner 204, in some embodiments, the second machine learner 204 compares the supply parameters 210 it generates for a time period to the observed transportation matching data for the same time period as that data becomes available. By comparing the supply parameters 210 to observed transportation matching data, the second machine learner 204 learns how to generate more accurate supply parameters 210 in subsequent iterations.

For example, the second machine learner 204 may compare the first and second supply parameters (for a geographic area and a time period) to observed numbers of reserve transportation vehicles and observed numbers of transportation requests (for the geographic area and the time period). By making this comparison, the second machine learner 204 determines the accuracy of the supply parameters 210 that define a number of transportation requests a dynamic transportation matching system can process while maintaining the number of reserve transportation vehicles for the geographic area and the time period. When the supply parameters 210 define a number of transportation requests that is inconsistent with an observed numbers of transportation requests that maintain a target number of reserve transportation vehicles, the second machine learner 204 updates the supply parameters 210 to be more accurate and accounts for this adjustment in future iterations of the supply parameters 210. Similarly, when the supply parameters 210 define a number of transportation requests that is inconsistent with observed numbers of transportation requests insufficient to maintain a target number of reserve transportation vehicles, the second machine learner 204 updates the supply parameters 210 to be more accurate and accounts for this adjustment in future iterations of the supply parameters 210.

Turning now to the next machine learner, the third machine learner 206 generally uses historical or updated transportation matching data to map numbers of transportation requests to multipliers. When mapping numbers of transportation requests to multipliers, the third machine learner 206 learns to generate conversion parameters 212 that define a conversion probability distribution identifying multipliers that induce the number of transportation requests for the geographic area and the time period. The conversion probability distribution indicates a likelihood that certain multipliers (for a geographic area during a time period) will induce the number of transportation requests (for the geographic area during the time period). In some embodiments, the third machine learner 206 uses the number of transportation requests identified by the second machine learner 204 to generate the conversion parameters 212.

As suggested above, each iteration of the conversion parameters 212 and the conversion probability distribution is specific to the geographic area and the time period. In other words, the third machine learner 206 uses transportation matching data for a geographic area and a time period to create each iteration of the conversion probability distribution. Accordingly, when identifying the relevant transportation matching data for the third machine learner 206, the dynamic transportation matching system 102 determines certain quantities associated with both the geographic area and the relevant time period.

To train the third machine learner 206 to generate the conversion parameters 212, the dynamic transportation matching system 102 optionally determines (and then inputs) transportation matching data for certain time periods of a specific geographic neighborhood, where the geographic neighborhood includes a relevant geographic area. For example, as a first input for the third machine learner 206, the dynamic transportation matching system 102 optionally determines a number of potential requestors whose client devices sent price queries for a geographic neighborhood during prior time periods. In some such embodiments, the dynamic transportation matching system 102 determines a number of potential requestors for each of various prior time periods relevant to a current time period (e.g., time periods on or within several days of the same annual date and/or day of the week).

As a second input for the third machine learner 206, the dynamic transportation matching system 102 optionally determines a price estimate accounting for a prior-applied multiplier provided to each potential requestor for the geographic neighborhood during the prior time periods. In some cases, the dynamic transportation matching system 102 determines a price estimate provided to each potential requestor for each of various prior time periods relevant to a current time period (e.g., time periods on or within several days of the same annual date and/or day of the week).

As a third input for the third machine learner 206, the dynamic transportation matching system 102 optionally determines a conversion rate of potential requestors who submitted a transportation request for the geographic neighborhood during the prior time periods. In some such embodiments, the dynamic transportation matching system 102 determines a conversion rate of potential requestors for each of various prior time periods relevant to a current time period (e.g., time periods on or within several days of the same annual date and/or day of the week).

As additional time periods approach or pass, in some embodiments, the dynamic transportation matching system 102 determines updated inputs for the third machine learner 206. For example, after a relevant time period passes, the dynamic transportation matching system 102 determines, as an updated first input for the third machine learner 206, an updated number of potential requestors whose client devices sent price queries for a geographic neighborhood during the time period. Additionally, after the relevant time period passes, the dynamic transportation matching system 102 determines, as an updated second input for the third machine learner 206, an updated price estimate accounting for an applied multiplier provided to each potential requestor for the geographic neighborhood during the time period. Moreover, after the relevant time period passes, the dynamic transportation matching system 102 determines, as an updated third input for the third machine learner 206, an updated conversion rate of potential requestors who submitted a transportation request for the geographic neighborhood during the time period. In other words, the dynamic transportation matching system 102 optionally continues to input transportation matching data into the third machine learner 206 as each time period passes (e.g., minute by minute, hour by hour).

Having received inputs from the dynamic transportation matching system 102, the third machine learner 206 applies an algorithm to the inputs to generate the supply parameters 210. For example, in some embodiments, the third machine learner 206 applies a Kalman filter to the inputs. Alternatively, in some embodiments, the third machine learner 206 applies another algorithm to the inputs to generate the conversion parameters 212. Such algorithms may include stochastic gradient descent; Particle filters, which are sometimes called Sequential Monte Carlo ("SMC") methods; Monte Carlo simulations, such as Markov chain Monte Carlo ("MCMC"); or Hidden Markov Models ("HMM").

By applying an algorithm, the third machine learner 206 generates the conversion parameters 212 for the multiplier model 214. For example, the third machine learner 206 generates a first conversion parameter representing a transportation-request probability of receiving a transportation request when the multiplier does not affect a base price for the geographic area during the time period. Additionally, the third machine learner 206 generates a second conversion parameter representing a rate at which the transportation-request probability decreases as the multiplier increases.

In some embodiments, the third machine learner 206 uses the following definition of transportation-request probability to generate the first and second conversion parameters. Specifically, a transportation-request probability equals the probability of receiving a transportation request when the multiplier is zero or does not affect a base price (i.e., $P_0$) multiplied by a rate at which the transportation-request probability decreases per unit of the multiplier increasing (i.e., $(1-r)$) raised to the multiplier divided by twenty five (i.e., $P_t/25$). In other words, the transportation-request probability equals $P_0*(1-r)^{(P_t/25)}$.

As noted above, in certain embodiments, the third machine learner 206 uses online machine learning to update the conversion parameters 212 as it determines updated inputs for additional time periods. As part of training the third machine learner 206, in some embodiments, the third machine learner 206 compares the conversion parameters 212 it generates for a time period to the observed transportation matching data for the same time period as that data becomes available. By comparing the conversion parameters 212 to observed transportation matching data, the third machine learner 206 learns how to generate more accurate conversion parameters 212 in subsequent iterations.

Additionally, when using online machine learning to update the conversion parameters 212, the third machine learner 206 optionally performs a Bayesian update of the first and second conversion parameters generated for each time period. In particular, the third machine learner 206 uses a slope-intercept equation of $y=a+b*p$, where the intercept a equals —log $P_0$, the slope b equals —log $(1-r)/25$, and p represents the multiplier. The third machine learner 206 performs a Bayesian update of the intercept a and the slope b from sequential observations of multipliers at each time period (i.e., $p_t$) and log probabilities at each time period (i.e., $y_t$=—log P/(transportation requests)).

The third machine learner 206 may compare the first and second conversion parameters (for a geographic area and a time period) to observed multipliers and observed numbers of transportation requests (for the geographic area and the time period). By making this comparison, the third machine learner 206 determines the accuracy of the conversion parameters 212 that define a conversion probability distribution identifying multipliers that induce the number of transportation requests for the geographic area and the time period. When the conversion parameters 212 define a conversion probability distribution inconsistent with the observed multipliers and observed numbers of transportation requests, the third machine learner 206 updates the conversion parameters 212 to be more accurate and accounts for this adjustment in future iterations of the conversion parameters 212.

After the machine learners 202-206 generate the efficiency parameters 208, supply parameters 210, and/or the conversion parameters 212, the multiplier model 214 uses the parameters as inputs to determine the multiplier 216. As suggested above, the multiplier model 214 determines the multiplier 216 for the dynamic transportation matching system 102 to multiply by a base price for a specific geographic area and time period. Consistent with the disclosure above, the multiplier model 214 determines the multiplier 216 to facilitate movement of transportation vehicles in and out of a geographic area during a time period. In some embodiments, the multiplier 216 adds to a base price to attract providers of transportation vehicles to a geographic area and maintain a target estimated time of arrival for pickup of a requestor.

When determining the multiplier 216, the multiplier model 214 analyzes the arrival-time probability distribution defined by the efficiency parameters 208 to determine a number of reserve transportation vehicles that, to a predetermined probability (e.g., 65%, 75%, 85%), will maintain a target estimated time of arrival for the geographic area and the time period. The dynamic transportation matching system 102 sets the target estimated time of arrival, such as by a policy or service-level agreement. Having determined the number of reserve transportation vehicles using the arrival-time probability distribution, the multiplier model 214 uses the supply parameters 210 and the supply function to determine a number of transportation requests that, to a predetermined probability, will maintain the number of reserve transportation vehicles. Finally, the multiplier model 214 analyzes the conversion probability distribution defined by the conversion parameters 212 to determine a multiplier that, to a predetermined probability, will induce the number of transportation requests for the geographic area and the time period.

As suggested above, in some embodiments, the multiplier model 214 iteratively performs this analysis to update the multiplier 216 for subsequent time periods of the geographic area. In other words, as the machine learners 202-206 generate updated efficiency parameters 208, updated supply parameters 210, and updated conversion parameters 212 for subsequent time periods, the multiplier model 214 also updates the multiplier 216. By updating the multiplier 216, the multiplier model 214 dynamically adjusts the multiplier 216 as transportation requests and available transportation vehicles vary from time period to time period.

In addition to updating the multiplier 216, in some embodiments, the multiplier model 214 generates and applies a smoothing parameter to ensure that multiplier reports and price estimates do not fluctuate too rapidly from one time period to another time period. In other words, the multiplier model 214 uses a smoothing parameter to temporally smooth changes in multiplier reports and price estimates with incremental adjustments.

When using a smoothing parameter, the multiplier model 214 optionally determines a smoothed multiplier using a smoothing function. For example, in some embodiments, the multiplier model 214 uses the smoothing factor as both a weight for a multiplier determined for a subsequent time period and a counter weight for a multiplier determined for a prior time period. In some such embodiments, the multiplier model 214 determines a smoothed multiplier for a time period one ($t_1$) as equal to the sum of the smoothing parameter subtracted from the integer one and multiplied by a first multiplier determined for a time period naught ($t_0$) and the smoothing parameter multiplied by a second multiplier determined for the time period one ($t_1$).

As further shown in FIG. 2, the dynamic transportation matching system 102 sends a multiplier report including a representation of the multiplier 216 to the provider client devices 110a-110n. The provider client devices 110a-110n then optionally present the multiplier report within graphical user interfaces of the provider applications 112a-112n. As the multiplier model 214 updates the multiplier 216, the dynamic transportation matching system 102 sends an updated multiplier report including a representation of the updated multiplier 216 to the provider client devices 110a-110n.

Additionally, or alternatively, in certain embodiments, the dynamic transportation matching system 102 sends price estimates accounting for the multiplier 216 to the requestor client devices 114a-114n in response to price queries 218. As the dynamic transportation matching system 102 receives the price queries 218, it also tracks which of the price queries 218 convert into transportation requests 220. As shown in FIG. 2, the third machine learner 206 receives the price queries 218 and the transportation requests 220 to determine a conversion rate. This determination enables the third machine learner 206 to detect price sensitivity and adjust the conversion parameters 212 accordingly from time period to time period.

Turning now to FIGS. 3A-3B, these figures illustrate a geographic neighborhood 300 that includes a geographic area 302 at two different time periods. FIG. 3A depicts the geographic neighborhood 300 and the geographic area 302 during a first time period. FIG. 3B depicts the geographic neighborhood 300 and the geographic area 302 during a second time period. Consistent with the disclosure above, the dynamic transportation matching system 102 determines the first multiplier for the geographic area 302 and the first time period, as well as a second multiplier for the geographic area 302 and the second time period. The dynamic transportation matching system 102 determines the first and second multipliers based in part on transportation matching data generated by provider client devices and requestor client devices within or around the geographic neighborhood 300 (e.g., some of the provider client devices 110a-110n and the requestor client devices 114a-114n).

As shown in FIG. 3A, the geographic neighborhood 300 includes transportation vehicles 304b-304i. A transportation vehicle 304a is also shown outside of the geographic neighborhood 300. Consistent with the disclosure above, provider client devices associated with the transportation vehicles 304a-304i send various and current transportation matching data to the dynamic transportation matching system 102, including, but not limited to, data concerning location; availability for a transportation request; and engagement with a transportation request to pick up, transport, or drop off a requestor. Based on this current transportation matching data, the dynamic transportation matching system 102 determines that, during the first time period (e.g., beginning of the first time period), the transportation vehicle 304a is outside of the geographic neighborhood 300, the transportation vehicles 304b-304i are within the geographic neighborhood 300, and the transportation vehicles 304d-304f are within the geographic area 302. Similarly, the dynamic transportation matching system 102 also determines that, during the first time period (e.g., beginning of the first time period), the transportation vehicles 304a, 304b, 304d, and 304e are available to pick up a requestor (i.e., available transportation vehicles) and that transportation vehicles 304c, 304f, 304g, and 304i are unavailable to pick up a requestor (i.e., unavailable transportation vehicles). In other words, transportation vehicles 304c, 304f, 304g, and 304i are picking up, transporting, or dropping off requestors.

As further shown in FIG. 3A, the geographic neighborhood 300 includes potential requestors 306a and 306b and requestors 308a and 308b. Consistent with the disclosure above, requestor client devices associated with the potential requestors 306a and 306b and with the requestors 308a and 308b send various and current transportation matching data to the dynamic transportation matching system 102, including, but not limited to, data concerning location, arrival queries, price queries, transportation requests, and payment information. Based on this current transportation matching data, the dynamic transportation matching system 102 determines that, during the first time period (e.g., beginning of the first time period), the potential requestor 306a and the requestor 308a are inside the geographic neighborhood 300, but outside of the geographic area 302. Similarly, the dynamic transportation matching system 102 determines that, during the first time period (e.g., beginning of the first time period), the potential requestor 306b and the requestor 308b are inside both the geographic neighborhood 300 and the geographic area 302.

In some embodiments, the dynamic transportation matching system 102 uses some of the current transportation matching data as inputs for the machine learners 202-206 to determine the first multiplier. For example, as inputs for the first machine learner 202 during the first time period, the dynamic transportation matching system 102 determines that the geographic area 302 includes two available transportation vehicles 304d and 304e and that the dynamic transportation matching system 102 provided potential requestor 306b an estimated time of arrival of four minutes. Additionally, as inputs for the third machine learner 206 for the first time period, the dynamic transportation matching system 102 determines that the geographic neighborhood 300 includes two potential requestors 306a and 306b whose client devices sent price queries and that the dynamic transportation matching system 102 provided potential requestors 306a and 306b with price estimates of $17.00 and $25.00, respectively.

Based in part on the inputs for the first time period just described, the first machine learner 202 and the third machine learner 206 generate efficiency parameters and conversion parameters for the geographic area 302 and the first time period. Consistent with the disclosure above, the multiplier model 214 uses the parameters generated by the machine learners 202-206 to determine a first multiplier for the geographic area 302 and the first time period. The dynamic transportation matching system 102 optionally uses the first multiplier to provide multiplier reports to providers and price estimates to potential requestors during the first time period.

Although the dynamic transportation matching system 102 may not use some of the current transportation matching data as immediate inputs for the machine learners 202-206, it gathers current transportation matching data for the first time period to use for comparison and adjustment of parameters and as inputs for subsequent time periods. For example, as inputs for the second machine learner 204 for the second time period, the dynamic transportation matching system 102 determines that the requestors 308a and 308b sent two transportation requests for rides originating within the geographic neighborhood 300 during the first time period and that the geographic neighborhood 300 includes four available transportation vehicles 304b, 304d, 304e, and 304h during the first time period.

FIG. 3B illustrates a change in location for each of the transportation vehicles 304a-304i and a new transportation vehicle 304j near the border of the geographic neighborhood 300. Based on updated transportation matching data from the provider client devices associated with the transportation vehicles 304a-304i, the dynamic transportation matching system 102 determines that, during the second time period (e.g., beginning of the second time period), the transportation vehicle 304j is outside of the geographic neighborhood 300, the transportation vehicles 304a-304h are within the geographic neighborhood 300, and the transportation vehicle 304f is within the geographic area 302. Similarly, the dynamic transportation matching system 102 determines that, during the second time period (e.g., beginning of the second time period), the transportation vehicles 304a, 304b, 304d, 304f, 304h, and 304j are available to pick up a requestor (i.e., available transportation vehicles) and that transportation vehicles 304c, 304g, 304e, and 304i are unavailable to pick up a requestor (i.e., unavailable transportation vehicles). In other words, transportation vehicles 304c, 304g, 304e, and 304i are picking up, transporting, or dropping off requestors. By contrast, the transportation vehicle 304f dropped off a requestor previously riding in the transportation vehicle 304f and is now available to pick up a requestor.

FIG. 3B also illustrates a change in status for the potential requestors 306a and 306b and the requestors 308a and 308b, as well as a new potential requestor 306c and a new requestor 308c. Based on updated transportation matching data from the requestor client devices associated with the potential requestors 306a-306c and the requestors 308a-308c, the dynamic transportation matching system 102 determines that, during the second time period (e.g., beginning of the second time period), each of the potential requestors 306a and 306b's respective requestor client devices—and the requestor 308c's requestor client device—have sent a transportation request. Accordingly, as shown in FIG. 3B, the potential requestors 306a and 306b are now requestors. By contrast, the dynamic transportation matching system 102 receives a price query and/or arrival query (but not yet a transportation request) from a requestor client device associated with the potential requestor 306c during the second time period (e.g., beginning of the second time period). Moreover, the dynamic transportation matching system 102 determines that, during the second time period (e.g., beginning of the second time period), the requestor 308a is still waiting for a transportation vehicle for pickup, but that the transportation vehicle 304e picked up the requestor 308b and is transporting her to a destination.

Additionally, based on the updated transportation matching data, the dynamic transportation matching system 102 determines that, during the second time period (e.g., beginning of the second time period), the potential requestor 306a and the requestors 308a and 308c are inside the geographic neighborhood 300, but outside of the geographic area 302. Similarly, the dynamic transportation matching system 102 determines that, during the second time period (e.g., beginning of the second time period), the potential requestors 306b and 308c are inside both the geographic neighborhood 300 and the geographic area 302.

In some embodiments, the dynamic transportation matching system 102 uses some of the updated transportation matching data as inputs for the machine learners 202-206 to determine the second multiplier. For example, as inputs for the first machine learner 202 during the second time period, the dynamic transportation matching system 102 determines that the geographic area 302 includes one available transportation vehicle 304f and that the dynamic transportation matching system 102 provided potential requestor 306c an estimated time of arrival of three minutes. Additionally, as inputs for the third machine learner 206 for the second time period, the dynamic transportation matching system 102 determines that the geographic neighborhood 300 includes one potential requestor 306c whose client device sent a price query and that the dynamic transportation matching system 102 provided the potential requestor 306c with a price estimate of $27.00.

As for the first time period—and based in part on the inputs for the second time period described above—the first machine learner 202 and the third machine learner 206 generate efficiency parameters and conversion parameters for the geographic area 302 and the second time period. As described above, the multiplier model 214 uses the parameters generated by the machine learners 202-206 to determine the second multiplier for the geographic area 302 and the second time period. The dynamic transportation matching system 102 optionally uses the second multiplier to provide multiplier reports to providers and price estimates to potential requestors during the second time period.

As with the first time period, the dynamic transportation matching system 102 also gathers updated transportation matching data for the second time period to use for comparison and adjustment of parameters and as inputs for subsequent time periods. For example, as inputs for the second machine learner 204 for a subsequent time period, the dynamic transportation matching system 102 determines that the potential requestors 306a and 306b and the requestor 308c sent three transportation requests for transportation services originating within the geographic neighborhood 300 during the second time period and that the geographic neighborhood 300 includes five available transportation vehicles 304a, 304b, 304d, 304f, and 304h during the second time period.

FIGS. 3A-3B provide a snapshot comparing the first and second time periods. As subsequent time periods approach and pass, in some embodiments, the dynamic transportation matching system 102 continues to collect and update transportation matching data for subsequent time periods. The dynamic transportation matching system 102 likewise continues to update parameters to in turn update and determine new multipliers for the geographic area 302.

Turning now to FIG. 4, this figure illustrates the provider client device 110a presenting a multiplier report 406 within a graphical user interface 404 of a screen 402. As suggested above, the provider application 112a comprises computer-executable instructions that cause the provider client device 110a to perform tasks depicted in FIG. 4, such as sending a transportation-vehicle-report request or presenting the multiplier report 406. Rather than repeatedly describe the computer-executable instructions within the provider application 112a as causing the provider client device 110a to perform such tasks, this disclosure primarily describes the provider client device 110a as performing such tasks as a shorthand for that relationship.

Consistent with the disclosure above, the multiplier report 406 facilitates inflow and outflow of transportation vehicles within and without a geographic area, such as the inflow and outflow of transportation vehicles 304a-304j within and without the geographic area 302. The multiplier report 406 facilitates such inflow and outflow by dynamically representing multipliers for the geographic area 302 (and for other geographic areas) for presentation to providers. The higher the multiplier for a geographic area, the more incentive a provider has to drive a transportation vehicle into the geographic area to pick up requestors in response to a transportation request.

As shown in FIG. 4, the multiplier report 406 includes a map 414 and an overlay of a geographic-neighborhood graphic 408 and a geographic-area graphic 410. In this example, the geographic-neighborhood graphic 408 represents the geographic neighborhood 300, and the geographic-area graphic 410 represents the geographic area 302. Although not labeled by reference number, the map 414 includes additional graphics representing areas outside of the geographic neighborhood 300 and the geographic area 302, including area graphic 412. While the multiplier report 406 represents each of the geographic areas within the geographic neighborhood 300 and areas outside the geographic neighborhood 300 with the underlying map 414, in this particular embodiment, the multiplier report 406 does not represent borders for each geographic area. In other embodiments, however, the dynamic transportation matching system 102 generates multiplier reports that depict borders for each geographic area.

As further depicted in FIG. 4, the multiplier report includes a color indicator for each of the geographic areas within the geographic-neighborhood graphic 408, including the geographic-area graphic 410, and the geographic areas within the area graphic 412. Although FIG. 4 depicts the color indicators as patterns, the color indicators may, for example, represent different shades of a color that correspond to a multiplier (e.g., different shades of pink, red, or blue). In this example, a darker color (or denser pattern) represents a higher multiplier, and no color (or no pattern) represents no multiplier. In other embodiments, a color scheme (or pattern scheme) includes a color (or pattern) corresponding to each multiplier, with no color (or no pattern) corresponding to no multiplier. In any case, in some embodiments, the multiplier may equal zero with no visible corresponding indicator.

As shown in FIG. 4, for example, the color indicator for the geographic-area graphic 410 represents a 150% multiplier that applies to a base price for the geographic area 302 during a time period. The color indicators for other geographic areas represented within the geographic-neighborhood graphic 408 represents a 100% multiplier that applies to base prices for the other geographic areas within the geographic neighborhood 300 during the time period, excluding the geographic area 302. Finally, the color indicators for geographic areas represented within the area graphic 412 represent a 50% multiplier that applies to base prices for the geographic areas within the area.

While the multiplier report 406 represents multipliers for each geographic area with color indicators, in some embodiments, the dynamic transportation matching system 102 represents multipliers with different indicators. For example, the dynamic transportation matching system 102 optionally generates and provides multiplier reports that represent multipliers with different borders, emojis, icons, patterns, numbers, or any other suitable indicator.

As noted above, the dynamic transportation matching system 102 optionally updates a multiplier for each geographic area with each time period. Consequently, the dynamic transportation matching system 102 also optionally updates multiplier reports to reflect the updated multipliers. For example, in some embodiments, the dynamic transportation matching system 102 sends data packets to one or more of the provider client devices 110a-110n comprising instructions that, when executed by the provider client devices 110a-110n, cause one or more of the provider client devices 110a-110n to render an updated multiplier report.

As the multiplier for a geographic region changes, the dynamic transportation matching system 102 alters the instructions to represent a different indicator for the geographic region. The dynamic transportation matching system 102 sends to a provider client device updated instructions that represent different indicators (and thus different multipliers for a geographic area) as the multipliers for a relevant geographic area changes and/or at set intervals as part of a cyclical update. For example, after receiving a transportation-vehicle-report request from the provider client device 110a, the dynamic transportation matching system 102 optionally sends updated instructions to represent a different indicator for a geographic area as each time period passes or as the multiplier for a geographic area changes.

Figure 5:
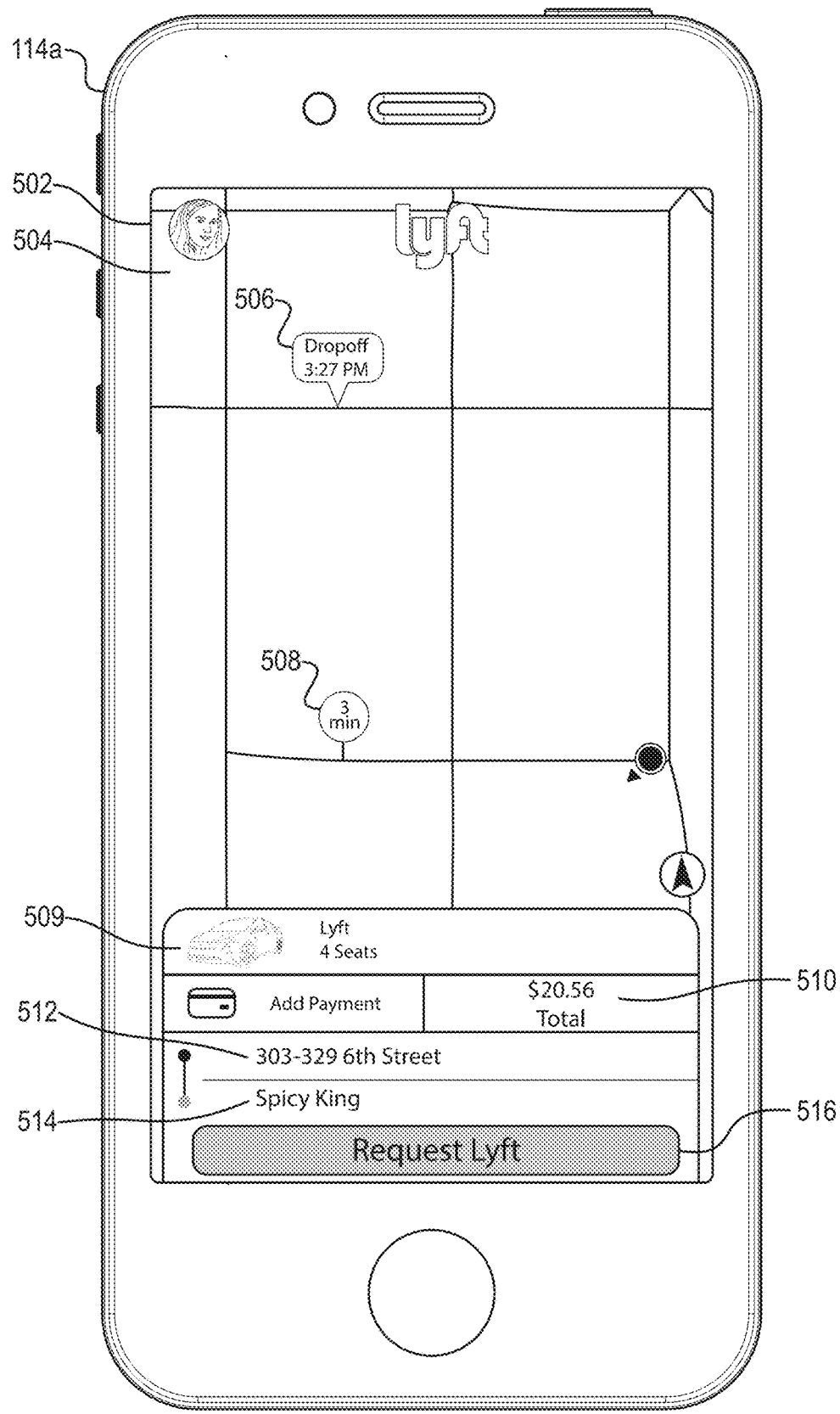
FIG. 5 illustrates a graphical user interface of a requestor client device presenting a price estimate that accounts for a multiplier and transportation-request option in accordance with one or more embodiments.

Turning now to FIG. 5, this figure illustrates the requestor client device 114a presenting a price estimate that accounts for a multiplier and a transportation-request option 516 within a graphical user interface 504 of a screen 502. As suggested above, the requestor application 116a comprises computer-executable instructions that cause the requestor client device 114a to perform tasks depicted in FIG. 5, such as sending a price query or presenting a price estimate. Rather than repeatedly describe the computer-executable instructions within the requestor application 116a as causing the requestor client device 114a to perform such tasks, this disclosure primarily describes the requestor client device 114a as performing such tasks as a shorthand for that relationship.

FIG. 5 illustrates a set of tools that the requestor application 116a includes to facilitate sending arrival queries, price queries, and transportation requests. As shown, the graphical user interface 504 includes a transportation-type field 509, a pickup-location field 512, and a destination field 514. In response to the requestor 118a entering or selecting a transportation type within the transportation-type field 509, a pickup location within the pickup-location field 512, and a destination in the destination field 514, the requestor client device 114a sends an arrival query and a price query to the dynamic transportation matching system 102. Upon receiving the arrival query and the price query, the dynamic transportation matching system 102 generates a price estimate for transportation that accounts for a multiplier. In particular, the dynamic transportation matching system 102 generates a price estimate using a base price and a multiplier determined for a current time period of the geographic area that includes the pickup location. Additionally, the dynamic transportation matching system 102 generates an estimated time of arrival for a transportation vehicle to pick up the requestor 118a at the pickup location.

As further indicated by FIG. 5, the dynamic transportation matching system 102 sends the price estimate and the estimated time of arrival to the requestor client device 114a in response to the price query and the arrival query, respectively. Upon receiving data packets from the dynamic transportation matching system 102 that encode for the price estimate and the estimated time of arrival, the requestor client device 114a presents the price estimate within a price-estimate field 510 and the estimated time of arrival within an arrival-time indicator 508. In some embodiments, the dynamic transportation matching system 102 further sends a dropoff-time estimate to the requestor client device 114a, which the requestor client device 114a presents within a dropoff-time indicator 506.

Upon receiving the price estimate and the estimated time of arrival, the requestor client device 114a activates a transportation-request option 516. As its name suggests, in response to the requestor 118a selecting the transportation-request option 516 (e.g., by touch gesture or click), the requestor client device 114a sends a transportation request to the dynamic transportation matching system 102. Upon receiving the transportation request, the dynamic transportation matching system 102 sends the transportation request to one or more of the provider client devices 110a-110n.

While FIG. 5 illustrates one example of a price estimate, in a different time period, the dynamic transportation matching system 102 may generate and send a different price estimate to a requestor client device for a price query with the same pickup location and destination. As noted above, in some embodiments, the dynamic transportation matching system 102 dynamically adjusts a multiplier for a geographic area including the pickup location. Accordingly, as the multiplier for the geographic area changes, the dynamic transportation matching system 102 sends price estimates to requestor client devices that reflect the updated multiplier.

Figure 6:
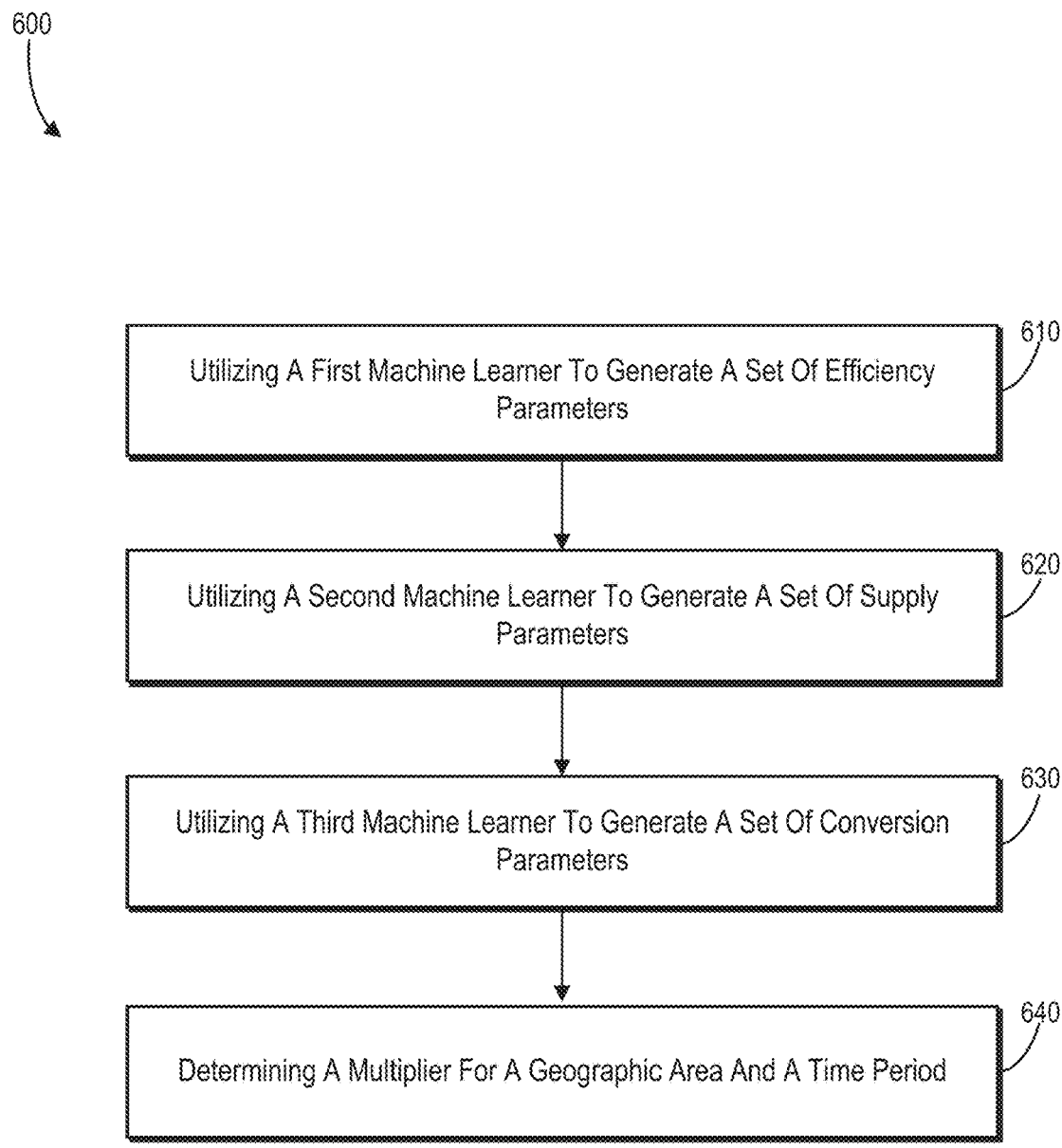
FIG. 6 illustrates a flowchart of a series of acts in a method of using machine learners to generate parameters for determining a multiplier that facilitates movement of transportation vehicles in and out of a geographic area during a time period in accordance with one or more embodiments.

Turning now to FIG. 6, this figure illustrates a flowchart of a series of acts 600 of using machine learners to generate parameters for determining a multiplier that facilitates movement of transportation vehicles in and out of a geographic area during a time period in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable storage medium can comprise instructions that, when executed by one or more processors, cause a computing device to perform the acts depicted in FIG. 6. In still further embodiments, a system can perform the acts of FIG. 6.

As shown in FIG. 6, the acts 600 include an act 610 of utilizing a first matching learner to generate a set of efficiency parameters. In particular, the act 610 includes utilizing a first machine learner to generate a set of efficiency parameters that define an arrival-time probability distribution of a number of reserve transportation vehicles required to maintain a target estimated time of arrival for a geographic area and a time period. In some such embodiments, utilizing the first machine learner to generate the set of efficiency parameters comprises utilizing the first machine learner to generate the set of efficiency parameters that define the arrival-time probability distribution of the number of reserve transportation vehicles required to maintain the target estimated time of arrival at all locations within the geographic area during the time period.

Similarly, in certain embodiments, utilizing the first machine learner to generate the set of efficiency parameters comprises utilizing the first machine learner to generate the set of efficiency parameters that define the arrival-time probability distribution of the number of reserve transportation vehicles required to maintain a target estimated time of arrival within a target percentile for the geographic area and the time period.

For example, in some embodiments, utilizing the first machine learner to generate the set of efficiency parameters comprises implementing a stochastic gradient descent to generate the set of efficiency parameters that define the arrival-time probability distribution of the number of reserve transportation vehicles required to maintain the target estimated time of arrival for the geographic area and the time period. Additionally, in certain embodiments, the first machine learner is an online machine learner.

Relatedly, in some embodiments, utilizing the first machine learner to generate the set of efficiency parameters comprises: determining, as a first input for the first machine learner, the number of available transportation vehicles for the geographic area during prior time periods; and determining, as a second input for the first machine learner, estimated times of arrival provided to potential requestors within the geographic area during the prior time periods.

Additionally, in certain embodiments, utilizing the first machine learner to generate the set of efficiency parameters comprises utilizing the first machine learner to generate: a first efficiency parameter representing a mean for the arrival-time probability distribution; a second efficiency parameter representing a variance for the arrival-time probability distribution; and a third efficiency parameter estimating a number of available transportation vehicles outside of an aggregation radius but inside a dispatch radius.

As further shown in FIG. 6, the acts 600 include an act 620 of utilizing a second machine learner to generate a set of supply parameters. In particular, the act 620 includes utilizing a second machine learner to generate a set of supply parameters that define a number of transportation requests a dynamic transportation matching system can process while maintaining the number of reserve transportation vehicles for the geographic area and the time period.

For example, in some embodiments, utilizing the second machine learner to generate the set of supply parameters comprises implementing a Kalman filter to generate the set of supply parameters that define the number of transportation requests a dynamic transportation matching system can process while maintaining the number of reserve transportation vehicles for the geographic area and the time period. Additionally, in certain embodiments, the second machine learner is an online machine learner.

Relatedly, in some embodiments, utilizing the second machine learner to generate the set of supply parameters comprises: determining, as a first input for the second machine learner, a number of transportation requests for a geographic neighborhood during prior time periods, the geographic neighborhood including the geographic area; and determining, as a second input for the second machine learner, a number of available transportation vehicles for the geographic neighborhood during prior time periods.

Additionally, in certain embodiments, utilizing the second machine learner to generate the set of supply parameters comprises utilizing the second machine learner to generate: a first supply parameter representing an estimated net inflow of transportation vehicles into a geographic neighborhood during the time period, the geographic neighborhood including the geographic area; and a second supply parameter representing an estimated average number of transportation requests a transportation vehicle can support for the geographic neighborhood during the time period.

As further shown in FIG. 6, the acts 600 include an act 630 of utilizing a third machine learner to generate a set of conversion parameters. In particular, the act 630 includes utilizing a third machine learner to generate a set of conversion parameters that define a conversion probability distribution identifying multipliers that induce the number of transportation requests for the geographic area and the time period.

For example, in some embodiments, utilizing the third machine learner to generate the set of conversion parameters comprises implementing a Kalman filter to generate the set of conversion parameters that define the conversion probability distribution identifying the multipliers that induce the number of transportation requests for the geographic area and the time period. Additionally, in certain embodiments, the third machine learner is an online machine learner.

Relatedly, in some embodiments, utilizing the third machine learner to generate the set of conversion parameters comprises: determining, as a first input for the third machine learner, a number of potential requestors whose client devices sent price queries for a geographic neighborhood during prior time periods, the geographic neighborhood including the geographic area; determining, as a second input for the third machine learner, a price estimate accounting for a prior-applied multiplier provided to each potential requestor for the geographic neighborhood during the prior time periods; and determining, as a third input for the third machine learner, a conversion rate of potential requestors who submitted a transportation request for the geographic neighborhood during the prior time periods.

Additionally, in certain embodiments, utilizing the third machine learner to generate the set of conversion parameters comprises utilizing the third machine learner to generate: a first conversion parameter representing a transportation-request probability of receiving a transportation request when the multiplier does not affect a base price for the geographic area during the time period; and a second conversion parameter representing a rate at which the transportation-request probability decreases as the multiplier increases.

As further shown in FIG. 6, the acts 600 include an act 640 of determining a multiplier for a geographic area and a time period. In particular, the act 640 includes determining a multiplier for the geographic area and the time period based on at least one of the set of efficiency parameters, the set of supply parameters, or the set of conversion parameters. For example, in certain embodiments, determining the multiplier for the geographic area and the time period based on the set of efficiency parameters, the set of supply parameters, and the set of conversion parameters comprises generating a smoothing parameter for application to prior multipliers for the geographic area and prior time periods; and determining the multiplier for the geographic area and the time period based in part on the smoothing parameter.

In addition to the acts 610-640, in some embodiments, the acts 600 further include generating a multiplier report comprising a representation of the geographic area and an indication of the multiplier for the geographic area. For example, in some embodiments, generating the multiplier report comprises generating a map for transportation vehicles comprising a representation of the geographic area and a color indicator for the multiplier for the geographic area.

In addition (or in the alternative) to generating a multiplier report, in some embodiments, the acts 600 further include determining, as an updated first input for the first machine learner, an updated number of available transportation vehicles for the geographic area during a subsequent time period; determining, as an updated second input for the first machine learner, updated estimated times of arrival provided to potential requestors within the geographic area during the time period; and utilizing the first machine learner to generate an updated set of efficiency parameters that define an updated arrival-time probability distribution of an updated number of reserve transportation vehicles required to maintain the target estimated time of arrival for the geographic area and the subsequent time period.

Additionally, in some embodiments, the acts 600 further include determining, as an updated first input for the second machine learner, an updated number of transportation requests for a geographic neighborhood during the time period, the geographic neighborhood including the geographic area; determining, as an updated second input for the second machine learner, an updated number of available transportation vehicles for the geographic neighborhood during the time period; and utilizing the second machine learner to generate an updated set of supply parameters that define an updated number of transportation requests to maintain an updated number of reserve transportation vehicles for the geographic area and a subsequent time period.

Similarly, in some embodiments, the acts 600 further include determining, as an updated first input for the third machine learner, an updated number of potential requestors whose client devices sent price queries for a geographic neighborhood during a time period, the geographic neighborhood including the geographic area; determining, as an updated second input for the third machine learner, an updated price estimate accounting for an applied multiplier provided to each potential requestor for the geographic neighborhood during the time period; determining, as an updated third input for the third machine learner, an updated conversion rate of potential requestors who submitted a transportation request for the geographic neighborhood during the time period; and utilizing the third machine learner to generate an updated set of conversion parameters that define an updated conversion probability distribution identifying updated multipliers that induce an updated number of transportation requests for the geographic area and a subsequent time period.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
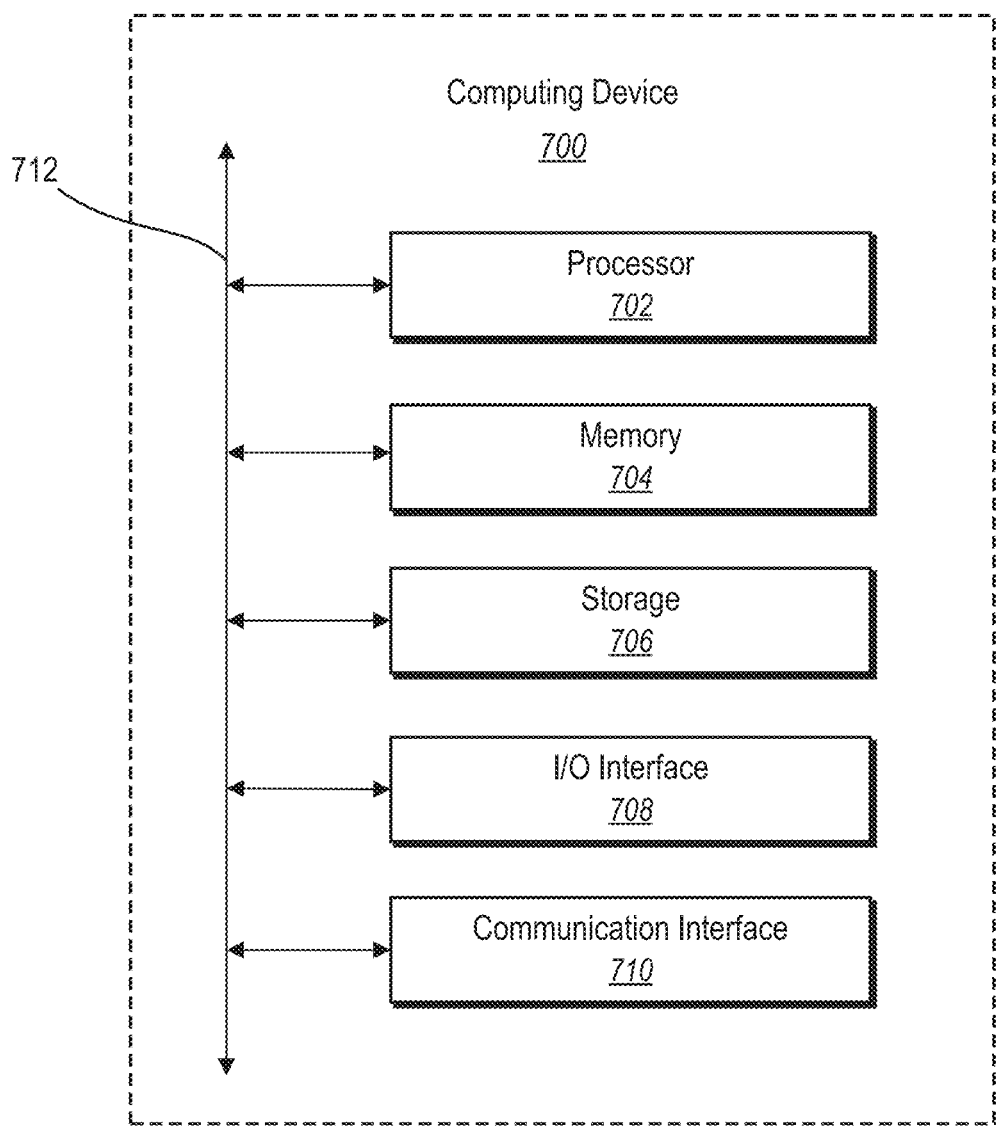
FIG. 7 illustrates a block diagram of a computing device in accordance with one or more embodiments.

FIG. 7 illustrates, in block diagram form, an exemplary computing device 700 that may be configured to perform one or more of the processes described above. One will appreciate that the dynamic transportation matching system 102 can comprise implementations of the computing device 700, including, but not limited to, the server(s) 104, the provider client devices 110a-110n, and the requestor client devices 114a-114n. As shown by FIG. 7, the computing device can comprise a processor 702, memory 704, a storage device 706, an I/O interface 708, and a communication interface 710. In certain embodiments, the computing device 700 can include fewer or more components than those shown in FIG. 7. Components of computing device 700 shown in FIG. 7 will now be described in additional detail.

In particular embodiments, processor(s) 702 includes hardware for executing instructions, such as those making up a computer program. As an example, and not by way of limitation, to execute instructions, processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, storage device 706 can comprise a non-transitory storage medium described above. The storage device 706 may include a hard disk drive ("HDD"), flash memory, a Universal Serial Bus ("USB") drive or a combination of these or other storage devices.

The computing device 700 also includes one or more input or output ("I/O") interface 708, which are provided to allow a user (e.g., requestor or provider) to provide input to (such as user strokes), receive output from, and otherwise transfer data to and from the computing device 700. These I/O interface 708 may include a mouse, keypad or a keyboard, a touch screen, camera, optical scanner, network interface, modem, other known I/O devices or a combination of such I/O interface 708. The touch screen may be activated with a stylus or a finger.

The I/O interface 708 may include one or more devices for presenting output to a user, including, but not limited to, a graphics engine, a display (e.g., a display screen), one or more output providers (e.g., display providers), one or more audio speakers, and one or more audio providers. In certain embodiments, interface 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device and one or more other computing devices 700 or one or more networks. As an example, and not by way of limitation, communication interface 710 may include a network interface controller ("NIC") or network adapter for communicating with an Ethernet or other wire-based network or a wireless NIC ("WNIC") or wireless adapter for communicating with a wireless network, such as a WI-FI. The computing device 700 can further include a bus 712. The bus 712 can comprise hardware, software, or both that couples components of computing device 700 to each other.

Figure 8:
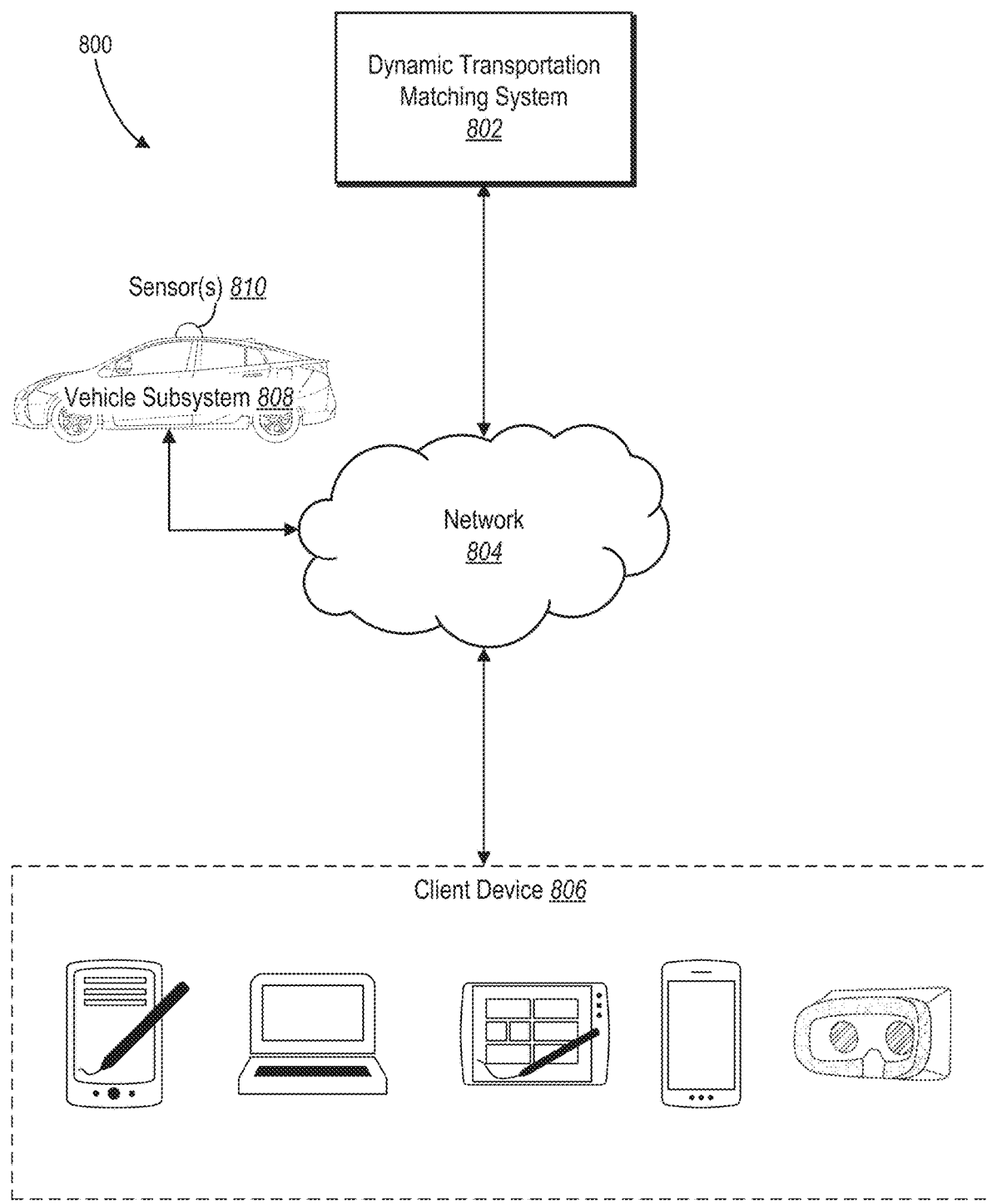
FIG. 8 illustrates an example environment for a dynamic transportation matching system in accordance with one or more embodiments.

FIG. 8 illustrates an example network environment 800 of a dynamic transportation matching system. The network environment 800 includes a client device 806, a dynamic transportation matching system 802, and a vehicle subsystem 808 connected to each other by a network 804. Although FIG. 8 illustrates a particular arrangement of the client device 806, dynamic transportation matching system 802, vehicle subsystem 808, and network 804, this disclosure contemplates any suitable arrangement of client device 806, dynamic transportation matching system 802, vehicle subsystem 808, and network 804. As an example, and not by way of limitation, two or more of client device 806, dynamic transportation matching system 802, and vehicle subsystem 808 communicate directly, bypassing network 804. As another example, two or more of client device 806, dynamic transportation matching system 802, and vehicle subsystem 808 may be physically or logically co-located with each other in whole or in part. Moreover, although FIG. 8 illustrates a particular number of client devices 806, dynamic transportation matching systems 802, vehicle subsystems 808, and networks 804, this disclosure contemplates any suitable number of client devices 806, dynamic transportation matching systems 802, vehicle subsystems 808, and networks 804. As an example, and not by way of limitation, network environment 800 may include multiple client device 806, dynamic transportation matching systems 802, vehicle subsystems 808, and networks 804.

This disclosure contemplates any suitable network 804. As an example, and not by way of limitation, one or more portions of network 804 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 804 may include one or more networks 804.

Links may connect client device 806, dynamic transportation matching system 802, and vehicle subsystem 808 to network 804 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client device 806 may be an electronic device including hardware, software, or embedded logic components or a combination of two or more such components and capable of carrying out the appropriate functionalities implemented or supported by client device 806. As an example, and not by way of limitation, a client device 806 may include any of the computing devices discussed above in relation to FIG. 7. A client device 806 may enable a network user at client device 806 to access network 804. A client device 806 may enable its user to communicate with other users at other client devices 806.

In particular embodiments, client device 806 may include a requestor application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 806 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 806 one or more Hyper Text Markup Language ("HTML") files responsive to the HTTP request. Client device 806 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, dynamic transportation matching system 802 may be a network-addressable computing system that can host a transportation matching network. Dynamic transportation matching system 802 may generate, store, receive, and send data, such as, for example, user-profile data, concept-profile data, text data, transportation request data, GPS location data, provider data, requestor data, vehicle data, or other suitable data related to the transportation matching network. This may include authenticating the identity of providers and/or vehicles who are authorized to provide transportation services through the dynamic transportation matching system 802. In addition, the dynamic transportation matching system may manage identities of service requestors such as users/requestors. In particular, the dynamic transportation matching system may maintain requestor data such as driving/riding histories, personal data, or other user data in addition to navigation and/or traffic management services or other location services (e.g., GPS services).

In particular embodiments, the dynamic transportation matching system 802 may manage transportation matching services to connect a user/requestor with a vehicle and/or provider. By managing the transportation matching services, the dynamic transportation matching system 802 can manage the distribution and allocation of resources from the vehicle systems 108a and 108n and user resources such as GPS location and availability indicators, as described herein.

Dynamic transportation matching system 802 may be accessed by the other components of network environment 800 either directly or via network 804. In particular embodiments, dynamic transportation matching system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, dynamic transportation matching system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 806, or a dynamic transportation matching system 802 to manage, retrieve, modify, add, or delete, the information stored in data store.

In particular embodiments, dynamic transportation matching system 802 may provide users with the ability to take actions on various types of items or objects, supported by dynamic transportation matching system 802. As an example, and not by way of limitation, the items and objects may include transportation matching networks to which users of dynamic transportation matching system 802 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in dynamic transportation matching system 802 or by an external system of a third-party system, which is separate from dynamic transportation matching system 802 and coupled to dynamic transportation matching system 802 via a network 804.

In particular embodiments, dynamic transportation matching system 802 may be capable of linking a variety of entities. As an example, and not by way of limitation, dynamic transportation matching system 802 may enable users to interact with each other or other entities, or to allow users to interact with these entities through an application programming interfaces ("API") or other communication channels.

In particular embodiments, dynamic transportation matching system 802 may include a variety of servers, sub-systems, programs, modules, logs, and data stores. In particular embodiments, dynamic transportation matching system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Dynamic transportation matching system 802 may also include suitable components such as network interfaces, security mechanisms, load balancers, failover servers, management-and-network-operations consoles, other suitable components, or any suitable combination thereof. In particular embodiments, dynamic transportation matching system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between dynamic transportation matching system 802 and one or more client devices 806. An action logger may be used to receive communications from a web server about a user's actions on or off dynamic transportation matching system 802. In conjunction with the action log, a third-party-content-object log may be maintained of user exposures to third-party-content objects. A notification controller may provide information regarding content objects to a client device 806. Information may be pushed to a client device 806 as notifications, or information may be pulled from client device 806 responsive to a request received from client device 806. Authorization servers may be used to enforce one or more privacy settings of the users of dynamic transportation matching system 802. A privacy setting of a user determines how particular information associated with a user can be shared. The authorization server may allow users to opt in to or opt out of having their actions logged by dynamic transportation matching system 802 or shared with other systems, such as, for example, by setting appropriate privacy settings. Third-party-content-object stores may be used to store content objects received from third parties. Location stores may be used for storing location information received from client devices 806 associated with users.

In addition, the vehicle subsystem 808 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 808 can include an autonomous vehicle—i.e., a vehicle that does not require a human operator. In these embodiments, the vehicle subsystem 808 can perform maneuvers, communicate, and otherwise function without the aid of a human provider, in accordance with available technology.

In particular embodiments, the vehicle subsystem 808 may include one or more sensors incorporated therein or associated thereto. For example, sensor(s) 810 can be mounted on the top of the vehicle subsystem 808 or else can be located within the interior of the vehicle subsystem 808. In certain embodiments, the sensor(s) 810 can be located in multiple areas at once—i.e., split up throughout the vehicle subsystem 808 so that different components of the sensor(s) 810 can be placed in different locations in accordance with optimal operation of the sensor(s) 810. In these embodiments, the sensor(s) 810 can include a LIDAR sensor and an inertial measurement unit ("IMU") including one or more accelerometers, one or more gyroscopes, and one or more magnetometers. The sensor(s) 810 can additionally or alternatively include a wireless IMU ("WIMU"), one or more cameras, one or more microphones, or other sensors or data input devices capable of receiving and/or recording information relating to navigating a route to pick up, transport, and/or drop off a requestor.

In particular embodiments, the vehicle subsystem 808 may include a communication device capable of communicating with the client device 806 and/or the dynamic transportation matching system 802. For example, the vehicle subsystem 808 can include an on-board computing device communicatively linked to the network 804 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A computer-implemented method comprising:
generating, utilizing one or more machine learners, a first set of parameters indicating a first number of transportation requests that can be processed for a geographic area at a first time period;
determining a first multiplier for the geographic area at the first time period based on the first set of parameters;
providing, for display on a provider device, a first graphical indicator of the first multiplier for the geographic area;
generating, utilizing the one or more machine learners, a second set of parameters indicating a second number of transportation requests that can be processed for the geographic area at a second time period;
determining a second multiplier for the geographic area at the second time period based on the second set of parameters; and
providing, for display on one or more provider devices, a second graphical indicator of the second multiplier for the geographic area.

2. The computer-implemented method of claim 1, wherein generating, utilizing the one or more machine learners, the first set of parameters comprises generating, utilizing the one or more machine learners, at least one of first efficiency parameters, first supply parameters, or first conversion parameters.

3. The computer-implemented method of claim 2, wherein determining the first multiplier comprises utilizing a multiplier model to generate the first multiplier from at least one of the first efficiency parameters, the first supply parameters, or the first conversion parameters for the geographic area at the first time period.

4. The computer-implemented method of claim 3, wherein providing, for display on the provider device, the first graphical indicator of the first multiplier for the geographic area comprises providing an interactive map displaying the first graphical indicator of the first multiplier overlapping the geographic area within the interactive map.

5. The computer-implemented method of claim 1, wherein generating the second set of parameters comprises generating, utilizing the one or more machine learners, at least one of second efficiency parameters, second supply parameters, or second conversion parameters.

6. The computer-implemented method of claim 5, wherein determining the second multiplier for the geographic area at the second time period comprises determining the second multiplier utilizing a multiplier model to from at least one of the second efficiency parameters, the second supply parameters, or the second conversion parameters for the geographic area at the second time period.

7. The computer-implemented method of claim 6, wherein providing, for display on the one or more provider devices, the second graphical indicator of the second multiplier for the geographic area comprises providing one or more interactive maps displaying the second graphical indicator of the second multiplier overlapping the geographic area within the one or more interactive maps.

8. A system comprising:
at least one processor; and
at least one non-transitory computer readable storage medium storing instructions that, when executed by the at least one processor, cause the system to:
generate, utilizing one or more machine learners, a first set of parameters indicating a first number of transportation requests that can be processed for a geographic area at a first time period;
determine a first multiplier for the geographic area at the first time period based on the first set of parameters;
provide, for display on a provider device, a first graphical indicator of the first multiplier for the geographic area;
generate, utilizing the one or more machine learners, a second set of parameters indicating a second number of transportation requests that can be processed for the geographic area at a second time period;
determine a second multiplier for the geographic area at the second time period based on the second set of parameters; and
provide, for display on one or more provider devices, a second graphical indicator of the second multiplier for the geographic area.

9. The system of claim 8, further comprising instructions that, when executed by the at least one processor, cause the system to generate the first set of parameters by generating, utilizing the one or more machine learners, at least one of first efficiency parameters, first supply parameters, or first conversion parameters.

10. The system of claim 9, further comprising instructions that, when executed by the at least one processor, cause the system to determine the first multiplier by utilizing a multiplier model to generate the first multiplier from at least one of the first efficiency parameters, the first supply parameters, or the first conversion parameters for the geographic area at the first time period.

11. The system of claim 10, further comprising instructions that, when executed by the at least one processor, cause the system to provide, for display on the provider device, the first graphical indicator of the first multiplier for the geographic area by providing an interactive map displaying the first graphical indicator of the first multiplier overlapping the geographic area within the interactive map.

12. The system of claim 8, further comprising instructions that, when executed by the at least one processor, cause the system to generate the second set of parameters by generating, utilizing the one or more machine learners, at least one of second efficiency parameters, second supply parameters, or second conversion parameters.

13. The system of claim 12, further comprising instructions that, when executed by the at least one processor, cause the system to determine the second multiplier for the geographic area at the second time period by determining the second multiplier utilizing a multiplier model to from at least one of the second efficiency parameters, the second supply parameters, or the second conversion parameters for the geographic area at the second time period.

14. The system of claim 13, further comprising instructions that, when executed by the at least one processor, cause the system to provide, for display on the one or more provider devices, the second graphical indicator of the second multiplier for the geographic area by providing one or more interactive maps displaying the second graphical indicator of the second multiplier overlapping the geographic area within the one or more interactive maps.

15. A non-transitory computer readable medium storing instructions thereon that, when executed by at least one processor, cause a system to:
  generate, utilizing one or more machine learners, a first set of parameters indicating a first number of transportation requests that can be processed for a geographic area at a first time period;
  determine a first multiplier for the geographic area at the first time period based on the first set of parameters;
  provide, for display on a provider device, a first graphical indicator of the first multiplier for the geographic area;
  generate, utilizing the one or more machine learners, a second set of parameters indicating a second number of transportation requests that can be processed for the geographic area at a second time period;
  determine a second multiplier for the geographic area at the second time period based on the second set of parameters; and
  provide, for display on one or more provider devices, a second graphical indicator of the second multiplier for the geographic area.

16. The non-transitory computer readable medium of claim 15, further comprising instructions that, when executed by the at least one processor, cause the system to generate the first set of parameters by generating, utilizing the one or more machine learners, at least one of first efficiency parameters, first supply parameters, or first conversion parameters.

17. The non-transitory computer readable medium of claim 16, further comprising instructions that, when executed by the at least one processor, cause the system to determine the first multiplier by utilizing a multiplier model to generate the first multiplier from at least one of the first efficiency parameters, the first supply parameters, or the first conversion parameters for the geographic area at the first time period.

18. The non-transitory computer readable medium of claim 17, further comprising instructions that, when executed by the at least one processor, cause the system to provide, for display on the provider device, the first graphical indicator of the first multiplier for the geographic area by providing an interactive map displaying the first graphical indicator of the first multiplier overlapping the geographic area within the interactive map.

19. The non-transitory computer readable medium of claim 15, further comprising instructions that, when executed by the at least one processor, cause the system to generate the second set of parameters by generating, utilizing the one or more machine learners, at least one of second efficiency parameters, second supply parameters, or second conversion parameters.

20. The non-transitory computer readable medium of claim 19, further comprising instructions that, when executed by the at least one processor, cause the system to:
  determine the second multiplier for the geographic area at the second time period by determining the second multiplier utilizing a multiplier model to from at least one of the second efficiency parameters, the second supply parameters, or the second conversion parameters for the geographic area at the second time period; and
  provide, for display on the one or more provider devices, the second graphical indicator of the second multiplier for the geographic area by providing one or more interactive maps displaying the second graphical indicator of the second multiplier overlapping the geographic area within the one or more interactive maps.

* * * * *